US012647154B2

(12) United States Patent
Canonne-Velasquez et al.

(10) Patent No.: US 12,647,154 B2
(45) Date of Patent: Jun. 2, 2026

(54) METHODS AND PROCEDURES FOR SIMULTANEOUS TRANSMISSIONS AND RECEPTION

(71) Applicant: INTERDIGITAL PATENT HOLDINGS, INC., Wilmington, DE (US)

(72) Inventors: Loic Canonne-Velasquez, Dorval (CA); Afshin Haghighat, Ile-Bizard (CA); Young Woo Kwak, Woodbury, NY (US); Moon Il Lee, Melville, NY (US); Paul Marinier, Brossard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/019,260

(22) PCT Filed: Aug. 5, 2021

(86) PCT No.: PCT/US2021/044807
§ 371 (c)(1),
(2) Date: Feb. 2, 2023

(87) PCT Pub. No.: WO2022/032009
PCT Pub. Date: Feb. 10, 2022

(65) Prior Publication Data
US 2024/0259053 A1 Aug. 1, 2024

Related U.S. Application Data

(60) Provisional application No. 63/185,733, filed on May 7, 2021, provisional application No. 63/094,731, filed
(Continued)

(51) Int. Cl.
H04B 7/0404 (2017.01)
H04B 7/022 (2017.01)
H04B 7/06 (2006.01)

(52) U.S. Cl.
CPC .......... H04B 7/0404 (2013.01); H04B 7/022 (2013.01); H04B 7/0626 (2013.01); H04B 7/0691 (2013.01); H04B 7/0696 (2023.05)

(58) Field of Classification Search
CPC .................................................. H04B 7/0404
(Continued)

(56) References Cited

U.S. PATENT DOCUMENTS

| 2015/0098347 A1* | 4/2015 | Guo | H04W 72/02 |
| | | | 370/252 |
| 2021/0258809 A1* | 8/2021 | Gao | H04W 24/08 |
| 2023/0262503 A1* | 8/2023 | Liu | H04W 24/10 |
| | | | 370/252 |

FOREIGN PATENT DOCUMENTS

WO 2020/056708 3/2020

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Lihong Yu
(74) *Attorney, Agent, or Firm* — Volpe Koenig

(57) ABSTRACT
System(s), method(s), and device(s) for simultaneous transmission and reception is disclosed here. A wireless transmit receive unit (WTRU) may have multiple antenna panels which may be capable of different modes of operation, such as simultaneous DL/DL (S-DD), simultaneous UL/UL (S-UU) and simultaneous DL/UL (S-DU). Further, the
(Continued)

Simultaneous DL/DL
201

Simultaneous UL/UL
202

Simultaneous DL/UL
203

WTRU may use each panel independently to communicate with multiple transmission and receive points simultaneously. The WTRU may accomplish this using transmission control indicators, reference signals, monitoring techniques suitable for multiple transmission and reception point communication.

11 Claims, 12 Drawing Sheets

Related U.S. Application Data on Oct. 21, 2020, provisional application No. 63/061,598, filed on Aug. 5, 2020.

(58) Field of Classification Search
USPC .......................................................... 375/262
See application file for complete search history.

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Interdigital, Inc., "CSI Enhancements for the Support of MTRP and FDD Reciprocity," 3GPP TSG RAN WG1 #103-e, R1-2007632, e-Meeting (Oct. 26-Nov. 13, 2021).

Interdigital, Inc., "CSI Enhancements for the Support of NCJT MTRP," 3GPP TSG RAN WG1 #104-e, R1-2100069, e-Meeting (Jan. 25-Feb. 5, 2021).

Interdigital, Inc., "Further Discussion on CSI Enhancements for NCJT MTRP," 3GPP TSG RAN WG1 #104b-e, R1-2102438, e-Meeting (Apr. 12-20, 2021).

Interdigital, Inc., "Views on CSI Enhancements for NCJT MTRP," 3GPP TSG RAN WG1 #105-e, R1-2104296, e-Meeting (May 10-27, 2021).

Nokia et al., "Enhancements on Multi-TRP/Panel Transmission," 3GPP TSG RAN WG1 #98bis Meeting, R1-1910915, Chongqing, China (Oct. 14-20, 2019).

Nokia et al., "On the CRI Definition and Usability in NR," 3GPP TSG-RAN WG1#89, R1-1708918, Hangzhou, P.R. China (May 15-19, 2017).

Third Generation Partnership Project, "Technical Specification Group Radio Access Network; NR; Radio Resource Control (RRC) protocol specification (Release 16)," 3GPP TS 38.331 V16.1.0 (Jul. 2020).

Third Generation Partnership Project, "Technical Specification Group Radio Access Network; NR; Radio Resource Control (RRC) protocol specification (Release 16)," 3GPP TS 38.331 V16.5.0 (Jun. 2021).

Third Generation Partnership Project, "Technical Specification Group Radio Access Network; NR; Physical layer procedures for data (Release 16)," 3GPP TS 38.214 V16.2.0 (Jun. 2020).

Third Generation Partnership Project, "Technical Specification Group Radio Access Network; NR; Physical layer procedures for data (Release 17)," 3GPP TS 38.214 V16.6.0 (Jun. 2021).

Third Generation Partnership Project, "Technical Specification Group Radio Access Network; NR; Multiplexing and channel coding (Release 16)," 3GPP TS 38.212 V16.2.0 (Jun. 2020).

Third Generation Partnership Project, "Technical Specification Group Radio Access Network; NR; Multiplexing and channel coding (Release 16)," 3GPP TS 38.212 V16.6.0 (Jun. 2021).

\* cited by examiner

FIG. 1D

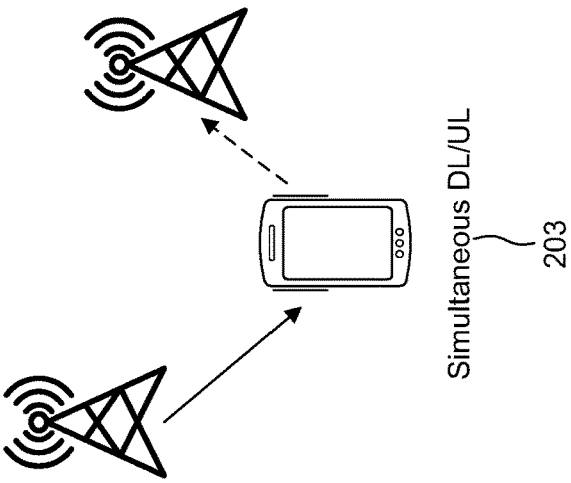
Simultaneous DL/UL
203
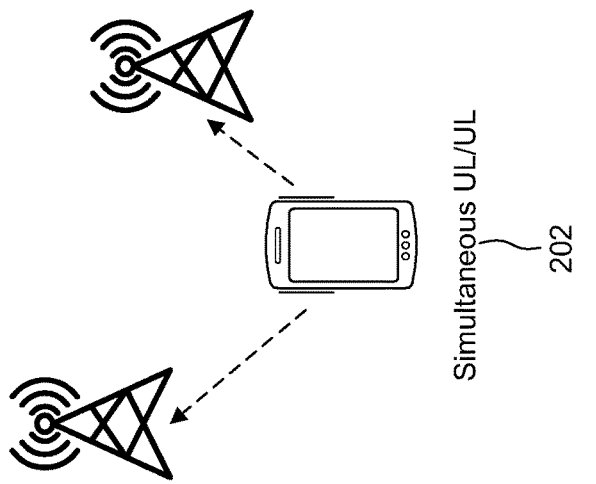
Simultaneous UL/UL
202
FIG. 2
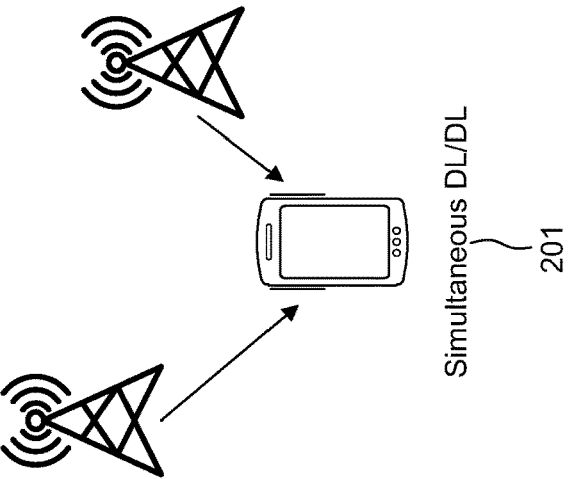
Simultaneous DL/DL
201

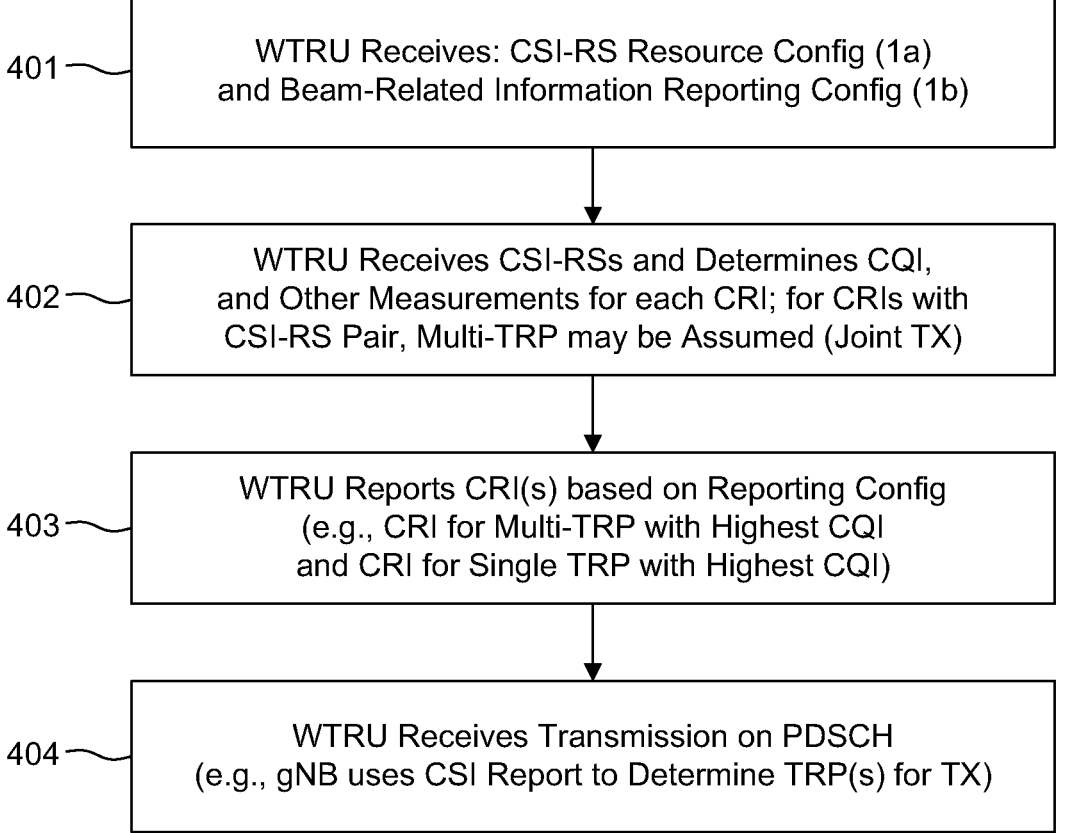

401 — WTRU Receives: CSI-RS Resource Config (1a)
and Beam-Related Information Reporting Config (1b)

402 — WTRU Receives CSI-RSs and Determines CQI,
and Other Measurements for each CRI; for CRIs with
CSI-RS Pair, Multi-TRP may be Assumed (Joint TX)

403 — WTRU Reports CRI(s) based on Reporting Config
(e.g., CRI for Multi-TRP with Highest CQI
and CRI for Single TRP with Highest CQI)

404 — WTRU Receives Transmission on PDSCH
(e.g., gNB uses CSI Report to Determine TRP(s) for TX)

FIG. 4A

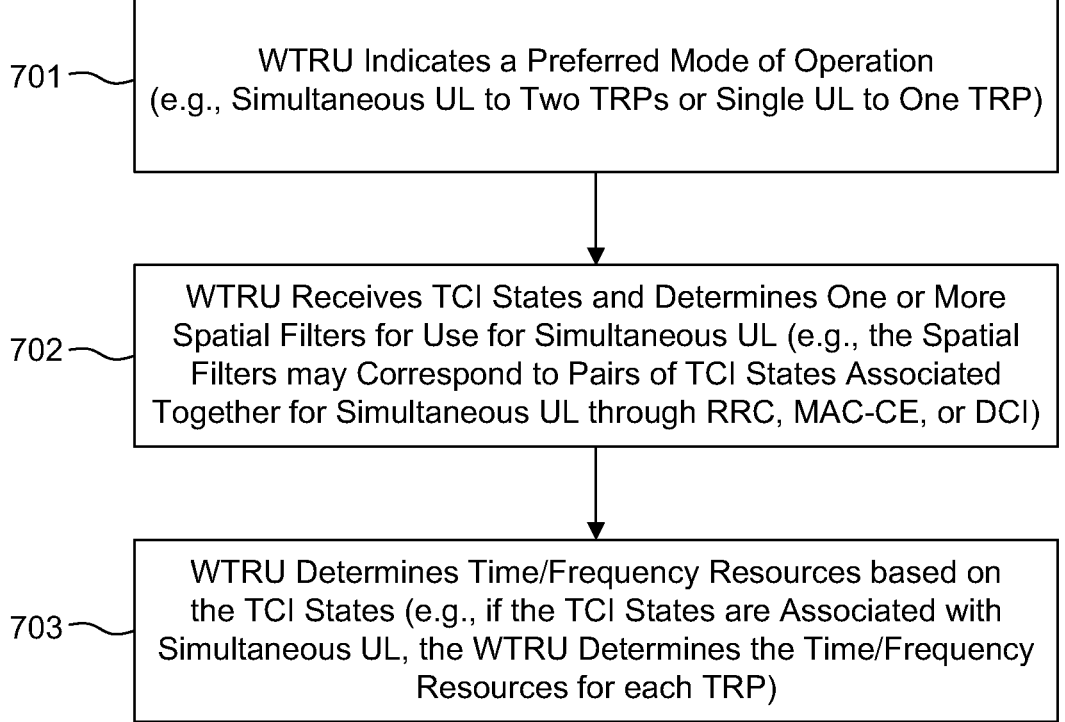

701 — WTRU Indicates a Preferred Mode of Operation (e.g., Simultaneous UL to Two TRPs or Single UL to One TRP)

702 — WTRU Receives TCI States and Determines One or More Spatial Filters for Use for Simultaneous UL (e.g., the Spatial Filters may Correspond to Pairs of TCI States Associated Together for Simultaneous UL through RRC, MAC-CE, or DCI)

703 — WTRU Determines Time/Frequency Resources based on the TCI States (e.g., if the TCI States are Associated with Simultaneous UL, the WTRU Determines the Time/Frequency Resources for each TRP)

FIG. 7

METHODS AND PROCEDURES FOR SIMULTANEOUS TRANSMISSIONS AND RECEPTION

CROSS-REFERENCE TO RELATED APPLICATIONS

This application is the U.S. National Stage, under 35 U.S.C. § 371, of International Application No. PCT/US2021/044807 filed Aug. 5, 2021, which claims the benefit of U.S. Provisional Application No. 63/061,598, filed Aug. 5, 2020, U.S. Provisional Application No. 63/094,731, filed Oct. 21, 2020, and U.S. Provisional Application No. 63/185,733, filed May 7, 2021, the contents of which are incorporated herein by reference.

BACKGROUND

Generally, in wireless communication systems the underlying technology is continuously advancing such that there is a need to address new use cases that arise from new hardware. For example, if the transmit/receive technology can perform two functions (e.g., send and/or receive) at the same time, then there is a need for systems, devices, and methods that address the details and protocols that may enable this type of wireless communication.

SUMMARY

System(s), method(s), and device(s) for simultaneous transmission and reception is disclosed here. A wireless transmit receive unit (WTRU) may have multiple antenna panels which may be capable of different modes of operation, such as simultaneous DL/DL (S-DD), simultaneous UL/UL (S-UU) and simultaneous DL/UL (S-DU). Further, the WTRU may use each panel independently to communicate with multiple transmission and receive points simultaneously. The WTRU may accomplish this using transmission control indicators, reference signals, monitoring techniques suitable for multiple transmission and reception point communication.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1D is a system diagram illustrating a further example RAN and a further example CN that may be used within the communications system illustrated in FIG. 1A according to an embodiment;

FIG. 2 is a diagram illustrating three modes of operation in a multipanel WTRU;

FIG. 4A is a flow chart of an example process for enhancements to CSI reporting for mTRP according to one or more techniques disclosed herein;

FIG. 7 is a flow chart of an example process for simultaneous UL TX to two TRPs.

DETAILED DESCRIPTION

Figure 1A:
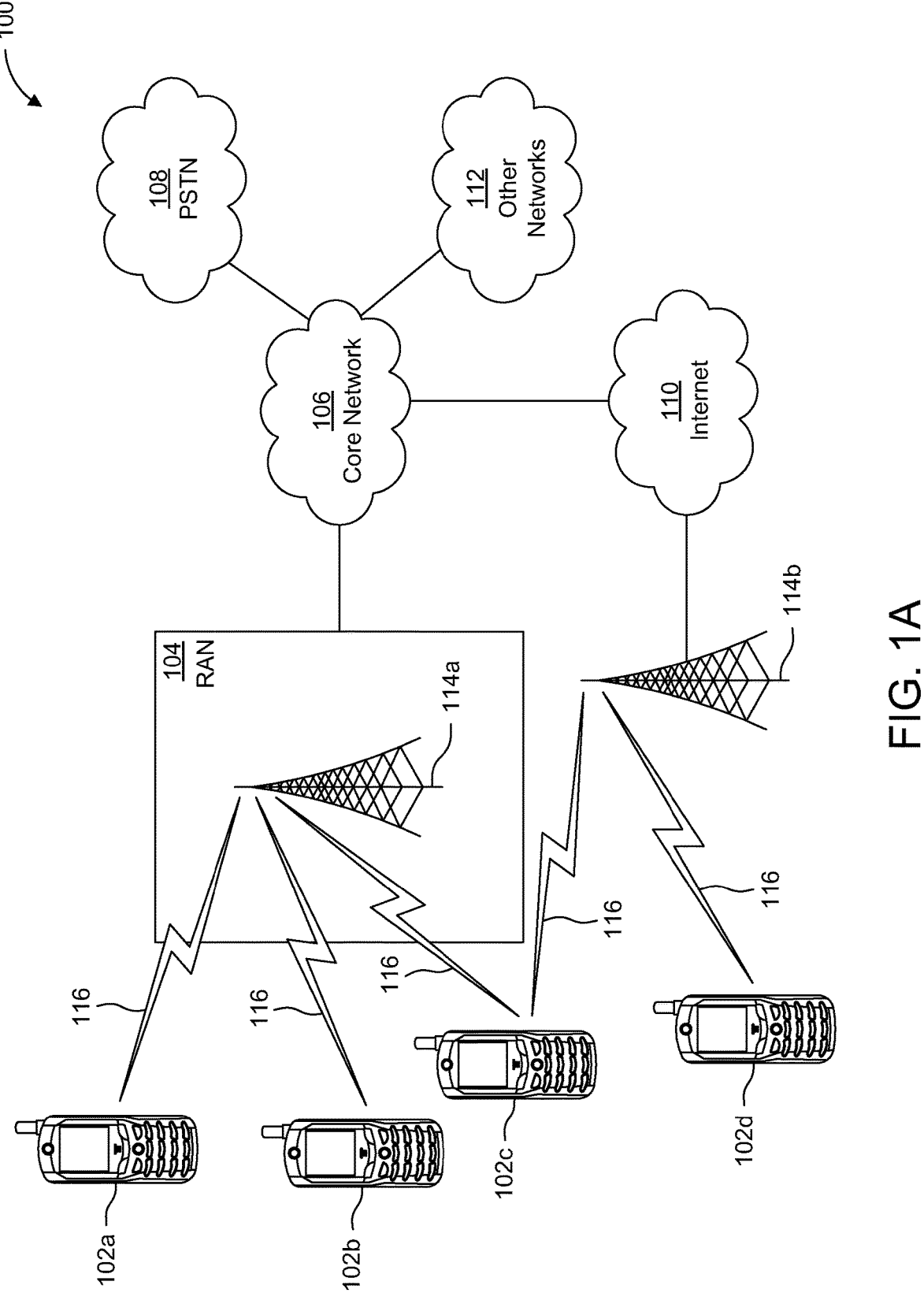
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
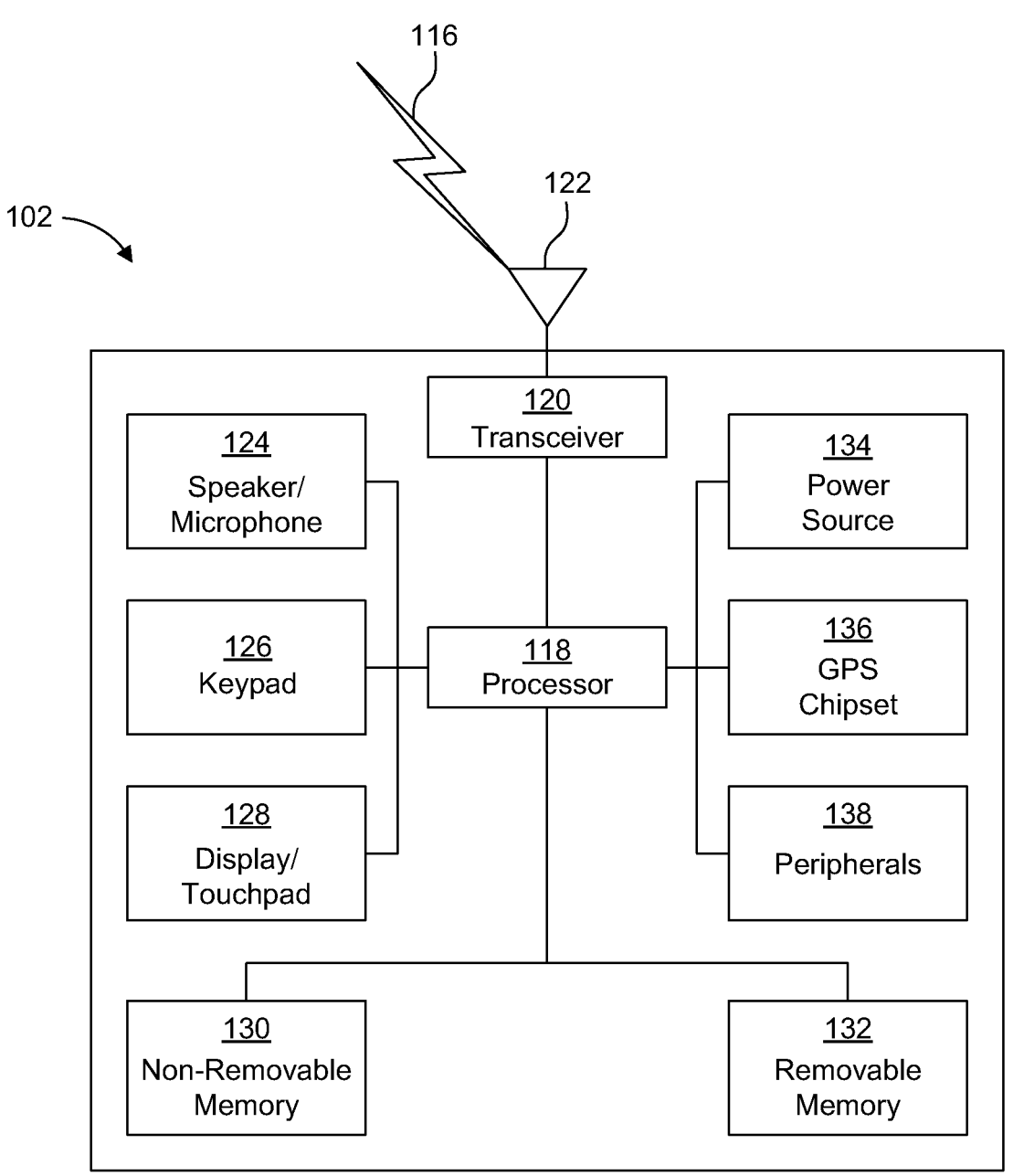
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
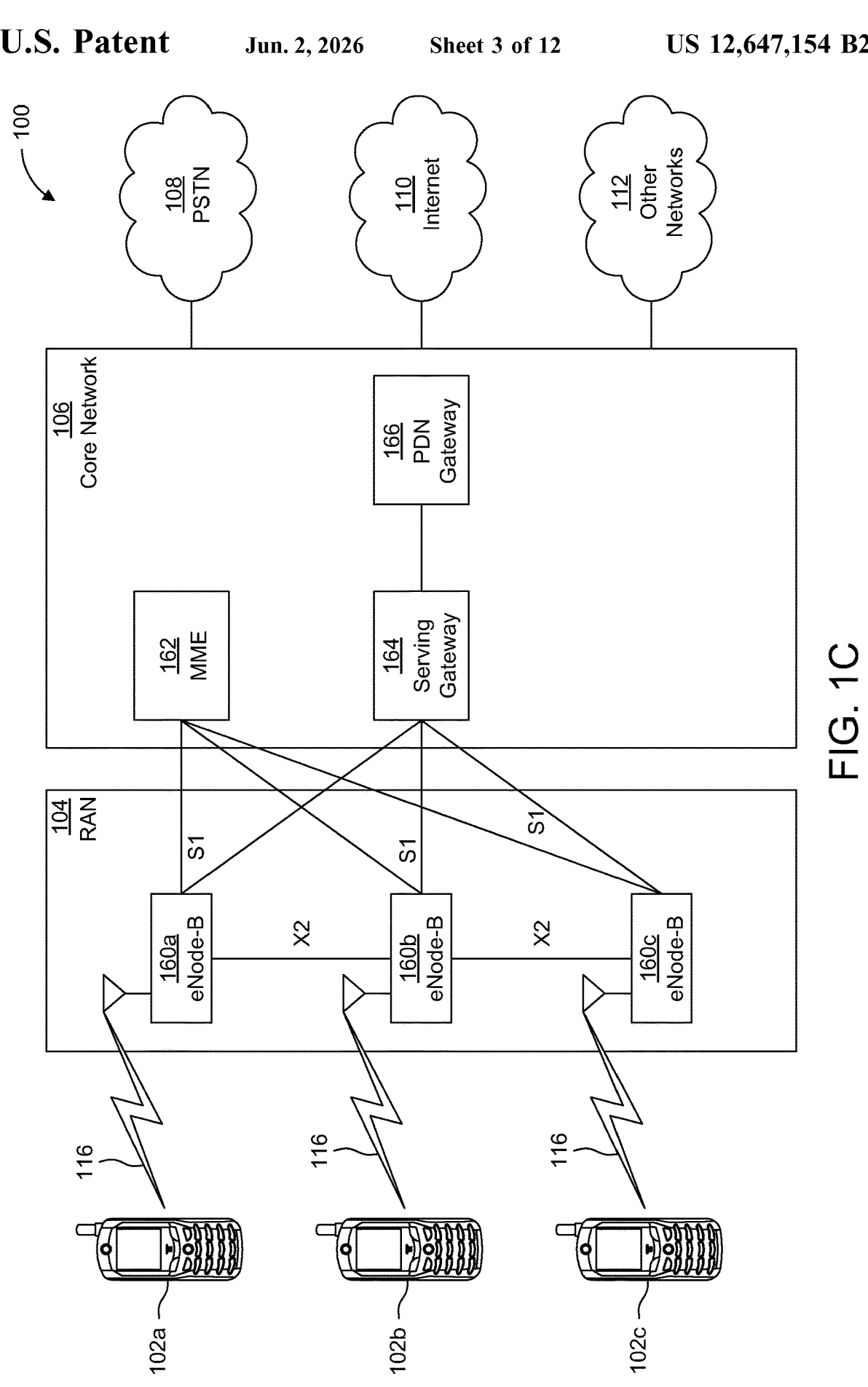
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
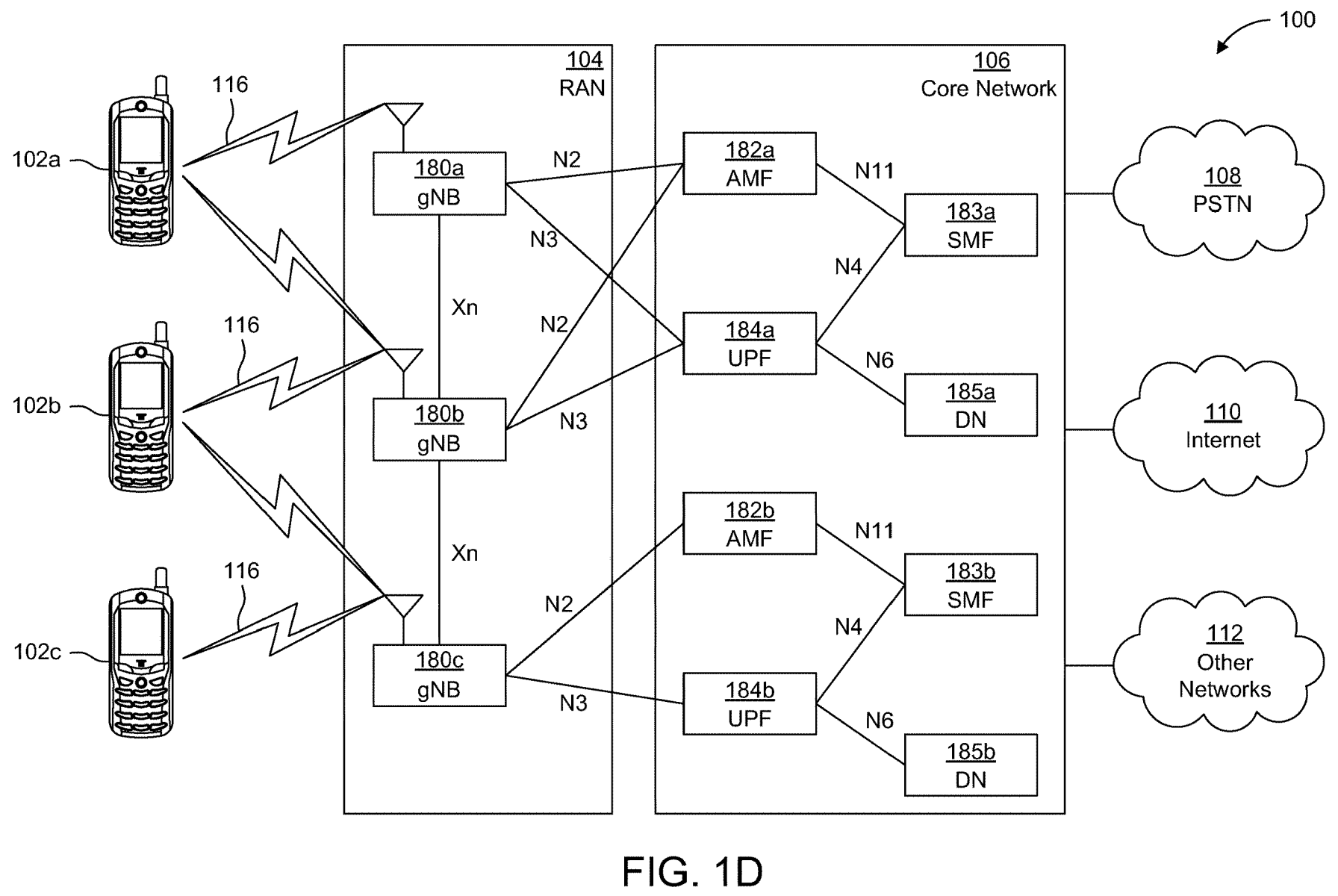

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106. Generally, any device that is not the WTRU may be considered a transmission reception point (TRP). Additionally/alternatively, any device on the network side (e.g., RAN side), may be considered a TRP (e.g., a base station, functional entity, etc.). A TRP may be any type of device capable of receiving and sending wireless signals, and may be responsible for a set of beams; the set may comprise one or more beams. This set of beams may be interchangeable with a beam group as discussed herein. For example, if a WTRU is configured with two beam sets, then it may be understood that the WTRU is in communication with at least two TRPs, or said another way, at least two TRPs are configured.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

In one instance, multiple base stations (e.g., gNBs 180a, 180b, 180c)/TRPs may be coordinated/configured to communicate with a single WTRU, resulting in a multi-TRP (mTRP) scheme. This may be particularly useful for WTRUs that have multiple antenna panels (e.g., WTRU 102a and 102b), which may enable multi-panel simultaneous transmission(s) and/or reception(s). Multiple panels may lend themselves to multi-TRP operation where the directionality of WTRU antennas may be used to simultaneously target more than one TRP at a time (e.g., WTRU 102a communicates with gNB 180a and gNB 180b). In some example uses cases, there may be WTRU mobility, WTRU rotation, maximum permissible emission (MPE), enhanced reliability, better spectrum efficiency, and others where multi-panel simultaneous transmission(s) and/or jreception(s) in a mTRP scheme may be advantageous. Alternatively/additionally, any approach disclosed herein to address these use cases may also be used in a single TRP scenario.

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Generally in new radio (NR), a beam management framework may be defined to support beam pairing between a WTRU and a base station (e.g., gNB). In iterations of NR, a communication/transmission mode based on multiple transmission and reception points (multi-TRP or mTRP) may be used to support multi downlink transmission. In some cases, however, the beam management operation may be similar to or the same as legacy implementations and may not be altered to support beam management in a multi-TRP scenario.

In considering NR on FR2 operation, and considering that in FR2, implementation of WTRUs with multiple panels may be more common, some aspects of MIMO enhancement may need to deal with multi-panel WTRU transmission and reception. Among the issues related to multi-panel WTRU operation, there is a need for approaches to simultaneous transmission(s) and/or reception(s).

In a multi-TRP transmission scheme, there may be several motivations to support multi-panel simultaneous transmission(s) and/or reception(s). For example, mobility, WTRU rotation, maximum permissible emission (MPE), enhanced reliability, better spectrum efficiency, and others are all among some example potential use cases for multi-panel simultaneous transmission(s) and/or reception(s). Moreover, any approaches disclosed herein to address these use cases may also be re-used in a single TRP scenario.

FIG. 2 is an example diagram showing three different modes of simultaneous transmission(s) and/or reception(s), such as: 201 simultaneous DL/DL (S-DD), 202 simultaneous UL/UL (S-UU), and 203 simultaneous DL/UL (S-DU). In these three basic scenarios, each UL or DL transmission may carry control or data information. For example, in a S-DD mode, a WTRU with multiple panels may simultaneously receive two PDSCHs or a PDSCH and a PDCCH, or two PDCCHs where each is transmitted from a different TRP. Similarly, a D-UU mode may be simultaneous transmission of two PUSCHs, or two PUCCHs or a PUSCH and PUCCH, where each one is transmitted on a different panel targeting a different TRP. Moreover, a S-DU is the mode by which a WTRU may simultaneously transmit a PUSCH or PUCCH on one panel and receive a PDSCH or PDCCH on another panel.

Each of these scenarios may impose different restrictions on interactions between a WTRU and TRPs, and how different resources are configured, activated, and used. As disclosed herein, there may be different scenarios and potential restrictions to consider in order to address an efficient beam management process for a multi-panel WTRU in a multi-TRP deployment.

In some cases, in a beam management framework there may be a process for pairing WTRU beams with TRP beams. However, there is a need for a optimizing these approaches for mTRP scenarios with multi-panel WTRUs where several transmission configurations may be considered. The transmission configuration indicator (TCI) and spatial relation frameworks of earlier implementations may not address a WTRU with multiple panels. Multiple panels may lend themselves to multi-TRP operation where the directionality of WTRU antennas may be used to simultaneously target more than one TRP at a time. For example, a WTRU with multiple panels may simultaneously receive signals where each one is transmitted from a different TRP. Similarly, a WTRU may simultaneously transmit two signals where each one may be transmitted on a different panel targeting a different TRP. Moreover, a WTRU may be capable of simultaneously transmitting on one panel and receiving on another one. For each of these scenarios, there is a need for address how a WTRU may need to behave when selecting spatial filters where it involves simultaneous operations on multiple panels. In one or more embodiments disclosed herein, these issues will be addressed and there may be some approaches and procedures related for the three different simultaneous transmission scenarios and other features as needed to address these issues.

In some embodiments, there may be methods for a S-DD transmission mode. Transmission control indicator (TCI) framework may take into consideration simultaneous TX by a WTRU, for example. In legacy systems, TCI states may be configured with a QCL assumption according to a source RS. The source RS may determine the spatial transmission filter used. In the case of simultaneous transmission, a WTRU may have the capability to simultaneously receive more than one TCI state at a time. However, in legacy systems, a transmitter may not be aware of which TCI states can be simultaneously received by the WTRU. In the approaches disclosed herein, in order to schedule multiple transmission to the WTRU, the TCI framework may configure the TCI states for S-DD operation so the WTRU may determine which TCI states are valid and so that the transmitter may select a subset of TCI states from all available states that the WTRU can receive.

In some situations, there may be a TCI configuration(s) with a WTRU panel index. A TCI configuration may include a panel index as part of the TCI configuration where the panel index refers to the WTRU panel. The WTRU may determine the TCI received on each of its panels based on the TCI and the associated panel index. The panel index may provide a link between TCI states and WTRU panels, and TCI states may be received on different panels. The transmitter may determine TCI states that belong to different panels and may schedule TCIs that may be simultaneously transmitted. The WTRU may use the panel index to provide association between an RX panel and a source RS. For example, one WTRU may have multiple panels and a WTRU may use multiple panels simultaneously to receive TCIs from different source RS. The panel index may be configured with the TCI as one or more of the following: an explicit panel ID that is associated to a WTRU panel, and/or a WTRU may receive the panel ID with the TCI (e.g., in a DCI, or the WTRU may determine it based on a MAC CE); an index to a group of RS, where a WTRU may use the RS group index as an implicit panel index, specifically where the RS group index may be used to determine the panel associated to the RS, a TRP may configure a group of RS with an index, and/or the TRP may include in the group different RS linked to the same WTRU panel; an UL TCI, where the UL TCI may be configured with a WTRU panel, either explicitly or implicitly, the UL TCI may be linked to the DL TCI, and the panel index for the DL TCI may be determined through the association with the UL TCI state; and/or, the TCI codepoint tables indexed by the panel, where a WTRU may be configured with two TCI codepoint tables where each codepoint table may be associated to a panel, the WTRU may use TCIs from separate tables to receive simultaneously, and/or the TCI codepoint tables may be linked together such that a WTRU may determine a TCI codepoint from one table based on the codepoint from another table.

In some situations, there may be a default WTRU behavior for S-DD beam selection. A WTRU receiving in S-DD may adjust its spatial receive filters to match the spatial transmit filters used by the transmitters. A WTRU may use one spatial receive filter per transmitter spatial filter. A WTRU may need a method to determine which pair of spatial transmission filters is used for the scheduling in S-DD mode.

In one case, a WTRU may determine the pair of transmission filters in one or more ways: explicit beam pair indication, and/or default beam pair determination. For explicit beam pair indication, a single DCI may include both explicit indices of the spatial transmission filters for the S-DD transmission, where the index of a spatial transmitter may comprise of an RS index (e.g., SSB, CSI-RS), and/or a TCI configured for DL or UL—where a WTRU may use reciprocity to determine its spatial receive filter based on an UL TCI, or it may use the DL TCI directly.

For default beam pair determination, a WTRU may determine a default S-DD beam pair based on a configuration. The default beam pair may be configured based on one or more factors.

One factor may be the traffic type. For example, for URLLC traffic type one default beam pair may be configured, and one default beam pair may be configured for eMBB traffic type.

One factor may be a basic S-DD pair, where a WTRU may be configured with a basic S-DD pair. For example, a WTRU may be preconfigured with RS1 and RS2 as the basic S-DD pair and the WTRU may use the basic S-DD pair anytime it is scheduled in S-DD mode without an explicit S-DD pair indicated. A WTRU may also determine to use the basic S-DD pair as fallback. For example, a WTRU may determine that HARQ retransmissions may be sent with the basic S-DD pair. Each HARQ process may be configured with a basic S-DD pair such that a WTRU may determine the basic S-DD pair based on the HARQ process number.

One factor may be on the last indication, where a WTRU may determine the default filter pair based on a prior history of spatial transmission filter within the parameters T or K, where T is a time window in seconds and K is an integer number of scheduling occasions. In one instance, a WTRU may determine the current S-DD RS pair as the same corresponding to the last S-DD RS pair indication used within the parameters. For example, last time S-DD was scheduled with RS1 and RS2. Next scheduling instance the same pair may be used and the WTRU may implicitly know it. In one instance, a WTRU may be configured with a time T or counting K value to determine which spatial filters may be used. For example, a WTRU may determine a RS pair that may be received simultaneously by searching based on a criteria within a period of T seconds or K scheduling instances. For example, a WTRU may count the most used pair, or the pair with the highest received signal quality (e.g., RSRP), or the pair with the least amount of failures/retransmission, etc. In one instance, a WTRU may determine that the last two RSs received on different panels may be used as the S-DD pair.

One factor may be a bandwidth part (BWP) ID, where a bandwidth part may be configured in S-DD mode and a WTRU may determine the TCI based on the BWP-ID. For example, a BWP-ID may be linked to a TCI value or a pair of TCI values for S-DD mode.

One factor may be a serving cell ID, where a serving cell ID may be configured for S-DD mode and linked to a basic TCI state ID, and a WTRU may determine a TCI value or a pair of TCI values from the serving cell ID.

One factor may be a slot format indicator (SFI), where a WTRU may receive an SFI that may be configured with slots for S-DD mode, and TCIs may be associated with the SFI. A WTRU may determine the TCI for S-DD based on the SFI.

One factor may be a CORESETpoolindex, where a WTRU may determine a TCI or TCI pair for S-DD based on a CORESETpoolindex. A basic S-DD pair may be associated to the CORESETpoolindex, and the WTRU may determine the basic S-DD pair implicitly from the CORESETpoolindex.

Similarly for the S-UU, a WTRU may determine its spatial transmission filters with default rules configured based on similar ideas as disclosed herein with relation to S-DD. For S-DD, the WTRU may determine its spatial receive filter whereas for the S-UU the WTRU may determine the spatial transmit filters. The rules for default WTRU behavior for S-DD spatial filter selection may apply to S-UU spatial filter selection.

In one or more embodiments, there may be techniques for supporting simultaneous monitoring of RS. With S-DD mode, it may be possible for multiple RS to be sent simultaneously and the WTRU may monitor multiple RS simultaneously such as CSI-RS or SSB. A WTRU may use multiple panels for simultaneous reception where each panel may receive a RS. The WTRU may perform measurements on each RS. In some cases, it may be beneficial to perform measurements simultaneously instead of one after another. Additionally, this may reduce the length of the beam sweeping procedure by enabling measurements per panel simultaneously.

In some situations, there may be monitoring with a WTRU switching receive filters. Specifically, one RS resource set may be configured with a flag identifying that the RS resources in the set may be used for S-DD mode. A WTRU may determine that any subset of RS resources from the set containing the S-DD flag may be monitored simultaneously, and a WTRU may determine to switch its spatial receive filter based on the resource set. The RS resources set may comprise of CSI-RS, SSB, or any other known signal.

Figure 3:
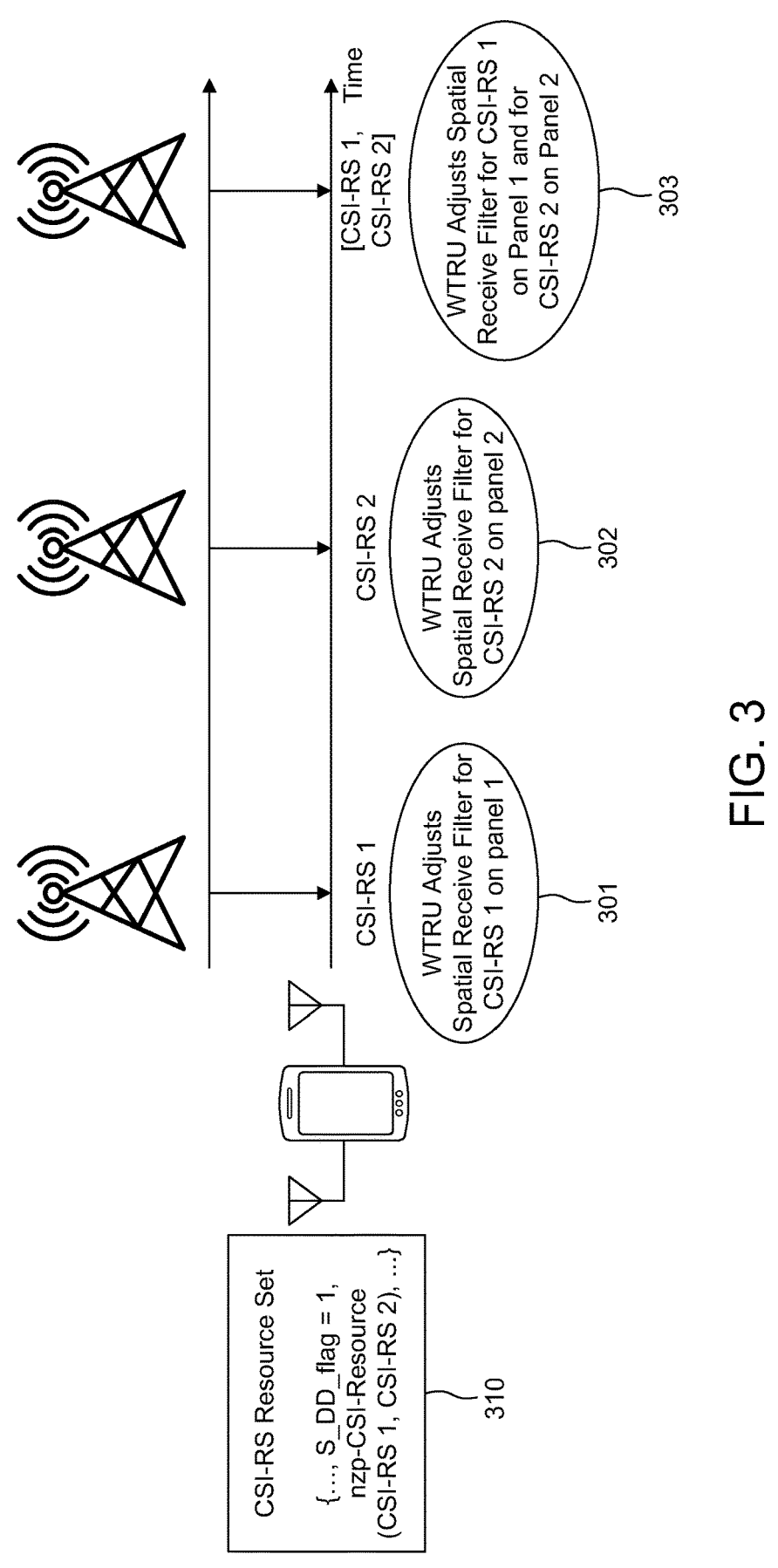
FIG. 3 is a diagram illustrating an example of enhancements to support simultaneous monitoring.

FIG. 3 is a diagram illustrating an example of enhancements to support simultaneous monitoring. As shown, a CSI-RS resource set may be configured (e.g., 310) with a flag for S-DD mode and two resources, CSI-RS1 and CSI-RS2. CSI-RS1 and CSI-RS2 may be configured with different periodicity that partially overlap such that on some time instances CSI-RS1 only is transmitted (e.g., 301), other time instances CSI-RS2 only is transmitted (e.g., 302), and other time instances CSI-RS1 and CSI-RS2 are transmitted simultaneously (e.g., 303). A WTRU may switch its reception mode from single panel to simultaneous reception mode when it determines that CSI-RS1 and CSI-RS2 are transmitted on the same time instance, and the S-DD flag is on (e.g., as shown in FIG. 3 at 303). The WTRU may activate/deactivate or turn on/off its panels to switch between single panel and S-DD reception mode based on the activated CSI-RS resource set and on the time instances where resources are transmitted. A WTRU may adjust its spatial receive filter differently for CSI-RS1 when it is received on its own rather than when it is transmitted simultaneously with CSI-RS2. Alternatively, a WTRU may determine that resources in a CSI-RS resource set with S-DD off may be received on a single panel (e.g., panel 1). A WTRU may determine to adjust its best spatial receive filter for panel 1 when receiving CSI-RS 1 or CSI-RS 2, and ignore time instants with simultaneous reception or the WTRU may follow a priority rule to monitor one RS (e.g., CSI-RS 1 over CSI-RS 2). However, if S-DD is configured on, a WTRU may determine that the resources may be received on different panels and a WTRU may adjust its (e.g., best) spatial filter for panel 1 to receive CSI-RS 1 and its (e.g., best) spatial filter for panel 2 to receive CSI-RS 2.

In some situations, an RS may be associated with a pool or TCI for simultaneous monitoring. Specifically, one RS resource may be configured with a pool index where a pool index may be shared by multiple TRPs or multiple panels at one TRP, and a WTRU may determine that (e.g., two) RSs linked to different pool indices may be received simultaneously. RS resources may be grouped according to ones with the same pool index such that a WTRU may monitor RSs simultaneously that are configured with different pool indices. For example, an RS from a pool with index 1 and an RS from a pool with index 2 may be linked, and a WTRU may determine that an RS from index 1 may be monitored simultaneously with an RS from index 2. The resources in the pool may belong to the same TRP or different TRPs. The WTRU may determine which RSs may be simultaneously monitored based on the CORESETpoolindex. For example, with a single DCI case scheduling simultaneous transmission from multiple TRP, the CORESETpoolindex=0 may be configured with RS1 from TRP1 and RS2 from TRP2. A WTRU may determine that RS1 and RS2 may be monitored simultaneously if the WTRU is scheduled with resources from a CORESET with CORESETpoolindex=0. Alternatively, an RS may be linked to a TCI and the WTRU may determine RSs to simultaneously monitor based on the TCI. For example, a WTRU may determine that it is scheduled with a TCI corresponding to one source RS for the WTRU to determine its spatial receive filter for the PDSCH, and the TCI may be associated to one or multiple RSs for monitoring. For example, a WTRU may determine that RS1 and RS2 are linked to a TCI state, and the WTRU may monitor simultaneously RS1 and RS2 when the TCI state is activated.

In one or more embodiments, in order to determine the best RS while in a mode of operation for beam management, a number of beams for simultaneous reception (Br) and a number of beams for simultaneous transmission (Bt) may be used.

A beam group may be used, defined, or configured and the beam group may be referred to as at least one of the following: beams in a beam group may be received or transmitted simultaneously (e.g., received or transmitted in the same symbol or slot), where each beam in a beam group may belong to a different antenna panel; a single beam in a beam group may be received or transmitted at a time, where all beams in a beam group may belong to the same antenna panel.

In some cases, a beam group may be defined, determined, used, or configured separately for transmission and reception. For example, a Tx beam group and a Rx beam group may be used.

The number of beams (e.g., Br, Bt) in a beam group may be determined based on one or more of following: a number of panels used, determined, or implemented at a WTRU, or a gNB; a capability indication from a WTRU; a higher layer configuration from a gNB or other network entity/node/module; and/or, a number of TRPs for a coordinated transmission and/or reception.

A beam group may be defined or used as a beam group index, beam group identity, beams from the same panel, beams associated with a same panel identity, beams from the same TRP, beams associated with a same TRP identity, and/or beams from the same cell. In some cases, a beam group may include a single beam.

As disclosed herein, a beam group may be interchangeably used with beam set, beam subset, beam pair, Tx/Tx beam pair, and Rx/Rx beam pair.

In one situation, one or more beam groups may be used and the number of beams for each beam group may be different. For example, a first beam group may include B1 beams and a second beam group may include B2 beams, wherein B1 #B2. In this situation, one or more of following may apply: a first beam group may include a single beam (e.g., B1=1) and a second beam group may include multiple beams (e.g., B2>1), where B2 may be the same number as the number of active panels, or active TRPs; and/or, a WTRU may determine a beam group (e.g., beam group identity) from one or more beam groups configured or used based on one or more factors.

An example of the one or more factors for determining a beam group may be one or more of the following: measurement quality of beams from one or more panels or TRPs; number of CORSET pool index(es) configured; number of panels active; and/or, number of TRPs for a join transmission/reception.

With regard to the measurement quality of beams from one or more panels or TRPs, in an example, a WTRU may measure beam reference signals from different panels or TRPs and if the gap between measurement results of different beam reference signals is larger than a threshold, a first beam group may be used. Otherwise, a second beam group may be used. Additionally/alternatively, a measurement quality may be based on L1-RSRP or L1-SINR. Additionally/alternatively, a beam reference signal from a panel or TRP may be a reference signal configured with a panel identity or TRP identity.

With regard to the number of CORESET pool index configured, in an example, a WTRU may use or determine a first beam group if a single CORESET pool index is used or configured and the WTRU may use or determine a second beam group if multiple CORESET pool indices are used or configured. Additionally/alternatively, a CORESET pool index may be configured per CORESET.

With regard to the number of panels active, in an example, a WTRU may use or determine a first beam group if the number of panels active is less than a threshold. Otherwise, the WTRU may use or determine a second beam group, wherein the first beam group may have a smaller number of beams than the second beam group. Additionally, alternatively, the threshold may be pre-determined (e.g., 1), pre-configured, configured, or indicated. Additionally/alternatively, the number of active panels may be determined based on at least one of following: WTRU capability indication; WTRU reporting (e.g., periodic, aperiodic, semi-persistent); gNB indication (e.g., configuration); mode of operation (e.g., power saving mode, normal power mode); frequency range (e.g., FR1, FR2); and/or, number of active bandwidth parts.

With regard to the number of TRPs for a joint transmission/reception, in an example, a WTRU may use or determine a first beam group if the number of TRPs for a joint transmission/reception is less than a threshold. Otherwise, the WTRU may use or determine a second beam group. Additionally/alternatively, the number of TRPs for a joint transmission/reception may be determined based on at least one of following: number of CORESET Pool index used or configured; and/or, number of PCID associated with CORESETs configured (e.g., each CORESET may be configured with physical cell identity (PCID) and the number of PCID may be the number of PCID used or configured for one or more CORESETs configured).

In one situation, one or more beam groups may be used and a WTRU may determine a beam group from the one or more beam groups used, wherein the determined beam group may be used or applied for one or more of followings: beam measurement reporting; joint or simultaneous reception of downlink channels and signals with different beams; and/or, joint or simultaneous transmission of uplink channels and signals with different beams.

Regarding beam measurement reporting, in one instance there may be a number of beams to report. For example, a WTRU may be configured to report Br beams as a reporting configuration, wherein Br may be determined based on the beam group determined. In another instance, there may be a number of reference signals to measure at the same time. For example, one or more reference signals may be configured with the same periodicity, slot, and/or symbol, wherein the number of reference signals to be measured at the same time may be determined based on the beam group determined.

Regarding joint or simultaneous reception of downlink channels and signals with different beams, in one instance there may be a number of CORESET pool indices used. For example, a single CORESET pool index may be used when a first beam group is determined. Otherwise, multiple CORESET pool indices may be used. Further, a CORESET that is configured with one or more CORESET pool indices that may be configured. A first CORESET pool index may be used when a first beam group is determined or used and a second CORESET pool index may be used when a second beam group is determined or used, and so forth. In one instance, there may be a number of TCI states indicated in a DCI. For example, a single TCI state may be indicated for a PDSCH reception when a first beam group is determined or used and multiple TCI states may be indicated for a PDSCH reception when a second beam group is determined or used.

Regarding joint or simultaneous transmission of uplink channels and signals with different beams, in one instance there may be a number of spatial relation information (e.g., SpatialRelationInfo or SRI) for uplink channel or signal. For example, a single spatial relation information or SRI may be used/indicated for an uplink transmission (e.g., PUCCH, SRS, PUSCH) when a first beam group is used or determined and multiple spatial relation information or SRIs may be used/indicated for an uplink transmission when a second beam group is used or determined. In one instance, an uplink channel or signal may be configured with one or more of spatial relation information groups or SRI groups; and a first spatial relation information group or SRI group may be used when a first beam group is determined or used; and a second spatial relation information group or SRI group may be used when a second beam group is determined or used. For example, the first spatial relation information group or SRI group may include a single spatial relation information or SRI and the second spatial relation information group or SRI group may include more than one spatial relation information or SRI. Further, which spatial relation information group or SRI group to use may be determined based on beam group determined or used. In one instance, a number bits for SRI field in DCI may be determined based on the beam group determined or used.

In one situation, there may be techniques for CSI reporting. Specifically, CSI reporting functionality may be enhanced to optimize reception from different panels at the WTRU side and/or transmission from different TRPs at the network side. Further, the enhancement may be such that the WTRU indicates beam-related information that satisfies desired macro-diversity requirements (e.g., multi-TRP transmission and/or multi-panel reception) if so configured.

As disclosed herein, beam-related information may correspond to at least a CSI-RS resource indicator (CRI), a SSB resource indicator (SSBRI), an indication of a panel used for reception at the WTRU (e.g., a panel identity or group identity), measurements such as L1-RSRP, L1-SINR taken from SSB or CSI-RS (e.g., cri-RSRP, cri-SINR, ssb-Index-RSRP, ssb-Index-SINR), and other channel state information such as a rank indicator (RI), channel quality indicator (CQI), precoding matrix indicator (PMI), and the like.

The WTRU may be configured with at least one set of CSI-RS or SSB resources for the purpose of reporting beam-related information. A CSI-RS resources may be configured with an additional TRP index. Equivalently, each of the at least one set of CSI-RS may be associated with a TRP index. The WTRU may measure and report beam-related information assuming reception from a specific panel or group identity. A panel or group identity may be defined such that, for example, the beam-related information is valid for simultaneous reception (e.g., using different spatial filters) when it corresponds to different panel or group identities. The WTRU may associate a panel identity to reception from a specific physical antenna panel, or to reception from any combination of antennas that satisfies the requirement of simultaneous reception with respect to other panel identities.

A WTRU may be configured to report beam-related information for each of a specific set of TRP indices and/or for each of a specific set of panel or group identities. The WTRU may also be configured to report for specific sets of combinations of TRP index and panel or group identities. The set of TRP indices and/or the set of panel or group identities, or combination thereof, applicable to a specific report may be configured by RRC (e.g., as part of a report configuration), signaled by MAC (e.g., as part of a MAC control element), and/or physical layer (e.g., from an aperiodic CSI request field of DCI whose possible values map to a set configured by higher layers).

In one situation, there may be constraints for reporting beam-related information: macro-diversity. To reduce CSI reporting overhead, the WTRU may be configured to report beam-related information for certain sets of combinations of TRP indices and panel or group identities only satisfying certain constraints. The constraints may be such that a corresponding transmission would satisfy certain requirements in terms of macro-diversity. For example, the WTRU may be configured to report beam-related information for a set of combinations that satisfy at least one of the following restrictions: the TRP index is different between any pair of combinations; the panel identity or group identity is different between any pair of combination; and/or, at least one of the TRP index or the panel identity, or group identity, is different between any pair of combinations. The following may be configured by RRC or signaled by MAC or DCI: the application of any such restriction, set thereof; and/or, the number of combinations for which beam-related information is reported, or maximum thereof.

In determining the combinations for which beam-related information is reported, the WTRU may prioritize first the combination with the highest measurement value, then the combination with the next highest measurement value that satisfies the restriction given the first combination, and so on.

Figure 4B:
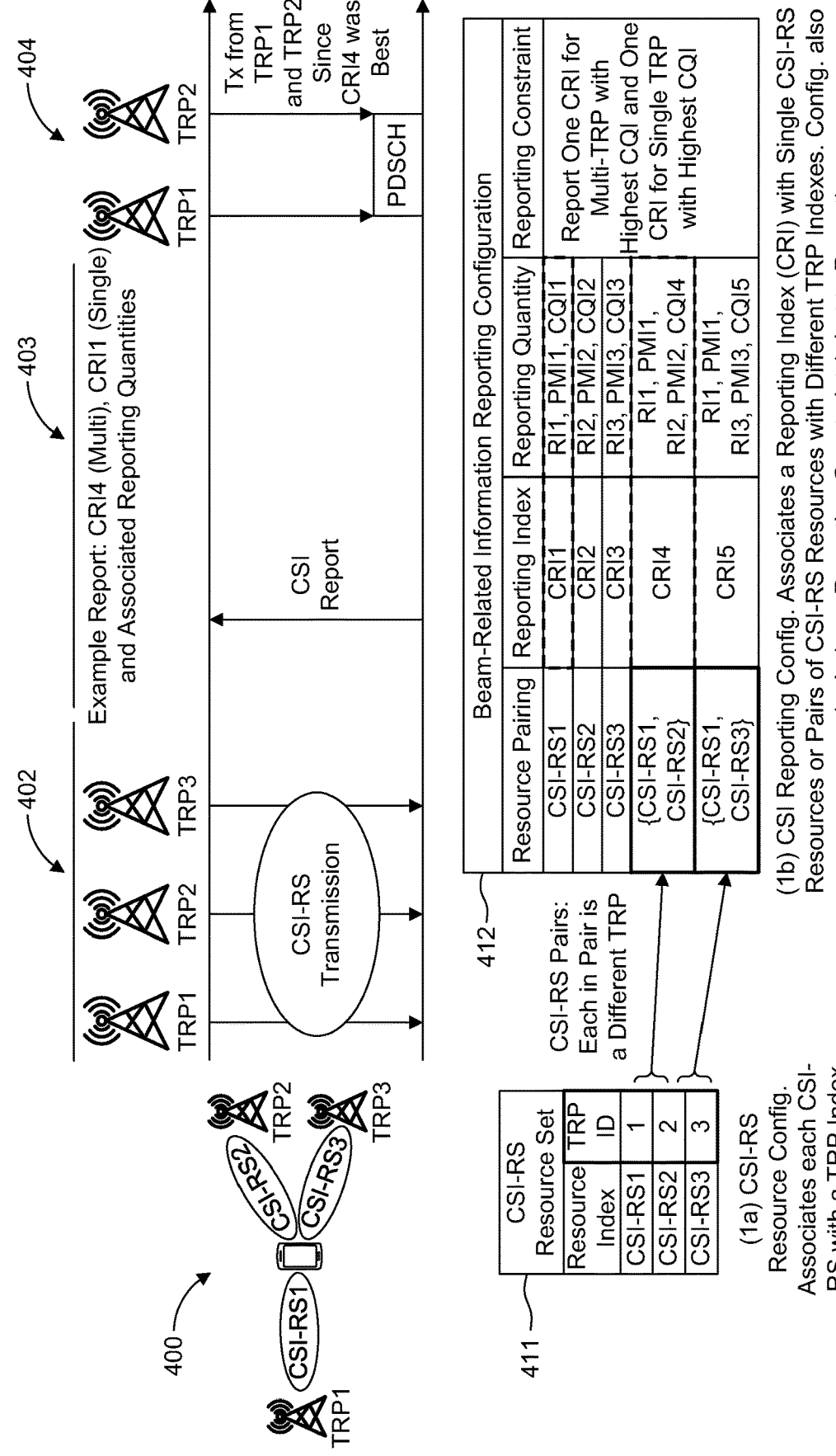
FIG. 4B is a diagram that illustrates an example of enhancements to CSI reporting for MTRP according to one or more techniques described herein.

The application of the two first restrictions in the above example may result in the WTRU providing beam-related information relevant in case the network intends to perform multi-TRP transmission that is received by different antenna panels at the WTRU, thus maximizing macro-diversity and robustness of the transmission FIG. 4A is a flow chart of an example process for enhancements to CSI reporting for mTRP according to one or more techniques disclosed herein. FIG. 4B is a diagram that illustrates an example of enhancements to CSI reporting for mTRP according to one or more techniques described herein. In this example 400, a WTRU may be in communication with three TRPs (e.g., TRP1, TRP2, and TRP3), each having a CSI-RS (e.g., CSI-RS1, CSI-RS2, and CSI-RS3). At 401, a WTRU may receive one or more configurations, including a CSI-RS resource configuration and a beam-related information reporting configuration (e.g., CRI/CSI/CQI reporting configuration). The CSI-RS resource configuration may comprise of a set of CSI-RS resources 411, where the set of CSI-RS resources may correspond to a TRP index (e.g., CSI-RS1 associated with TRP 1, etc.). The beam-related information reporting configuration may comprise of the reporting information for a CRI for one or more sets of TRPs; accordingly, in mTRP, there may be a set of more than one TRPs associated with one CRI, and with a single TRP there may by a set of one TRP associated with one CRI. Further, for each CSI-RS that is reported, there may be beam related information (e.g., CRI), such that the CRI may be associated with one or more TRP and one or more CSI-RS resource. For example, see the thick lined black boxes and arrows between 411 and 412, which show that more than one TRP may be associated with one CRI for a given CSI-RS pair. At 402, the WTRU may receive/measure one or more CSI-RSs and determine measurement information (e.g., CSI, CQI, beam-related information, and/or the like), for each CRI. For CRIs with a CSI-RS pair, a mTRP scenario may be assumed since there would be more than one TRP (e.g., joint TX). At 403, the WTRU may report CRI(s) based on the reporting configuration. Specifically, as described herein, there may be a constraint on the reporting to address macro-diversity (e.g., mTRP scenarios). The WTRU may have been previously provided one or more constraints. The WTRU may prioritize the pair/combination with the highest measurement value (e.g., CRI for mTRP with the highest CQI and CRI for single TRP with highest CQI). At 404, the WTRU may receive a transmission on a PDSCH that was chosen based on the reported information (e.g., gNB uses the reported CSI to determine TRP(s) for the transmission). Note, in an example report of 403 (e.g., dash-lined boxes of 412) the WTRU may report CRI4 (e.g., mTRP), and CRI1 (e.g., single TRP), and the associated reporting quantities (e.g., beam-related information such as RI, CQI, PMI, etc.); since CRI4 was best, then the resulting transmission (e.g., PDSCH) may be received at the WTRU from TRP1 and TRP2 since CRI4 was associated with the resource pair CSI-RS1 and CSI-RS2.

In one situation, there may be condition lifting of constraints based on measurement results. Specifically, a restriction may be lifted under a condition that applying the restriction would result in reporting a metric or measurement that would be worse by more than a threshold, compared to not applying the restriction. For example, the L1-RSRP value may be a first value for the combination of TRP index 1 and panel identity 1, and a second value for the combination of TRP index 1 and panel identity 2, where the first value may be higher than the second value. The WTRU may already have determined a combination including panel identity 1. In such a case the WTRU may report for the combination of TRP index 1 and panel identity 2 under a condition that the second value is higher than the first value minus a threshold, and report for the combination of TRP index 1 and panel identity 1 otherwise. Such lifting of the restriction based on measurement difference may avoid reporting beam-related information for transmission options that would not provide significant macro-diversity benefit.

In one situation, there may be constraints for reporting beam-related information: TCI state configuration. Specifically, the WTRU may be configured to report beam-related information only for subset of resources that are configured as part of specific TCI states. The TCI states may be the a subset of the set of TCI states configured by RRC as indicated by configuration or may correspond to the set of active TCI states from MAC signaling.

In one situation, there may be constraints for reporting beam-related information: based on PUCCH resource selection. In one instance, a WTRU may determine the spatial filters (e.g., RS indices) to include in a CSI report based on a PUCCH resource configuration. When the WTRU is configured with a PUCCH resource, it may be configured with a subset/set of RSs that may be valid to report (e.g., where all RSs are a set, and there is a subset of RSs of the set of RSs that may be valid to report). As explained, the RSs may be configured into sets, and the sets may have indices that may be linked to the PUCCH resource configuration. The PUCCH resource configuration may be a PUCCH Resource Indicator (PRI) within a PUCCH resource set, a subset of PRIs, or multiple PUCCH resource sets. For example, a WTRU may be configured with 3 RS (RS1, RS2, RS3) and 2 PUCCH resources (PUCCH1, PUCCH2). RS1 and RS2 may be grouped into set 1 and RS3 may be grouped into set 2. A WTRU may choose to only report a RS from set 1 using PUCCH1, and report an RS from set 2 on PUCCH2.

In one instance, PUCCH resources may be preconfigured or dynamically indicated in a DCI. The configuration between PUCCH resource and RS sets may be done by the TRP based on the network configuration, WTRU feedback, or a combination of both. The TRP may monitor both PUCCH resources. The WTRU may report on both PUCCH resources or the WTRU may choose to report on only one PUCCH resource. The WTRU may determine the PUCCH resources based on the TRP index, the DCI with an explicit indication, signal quality of the SRI, and the like.

Figure 5:
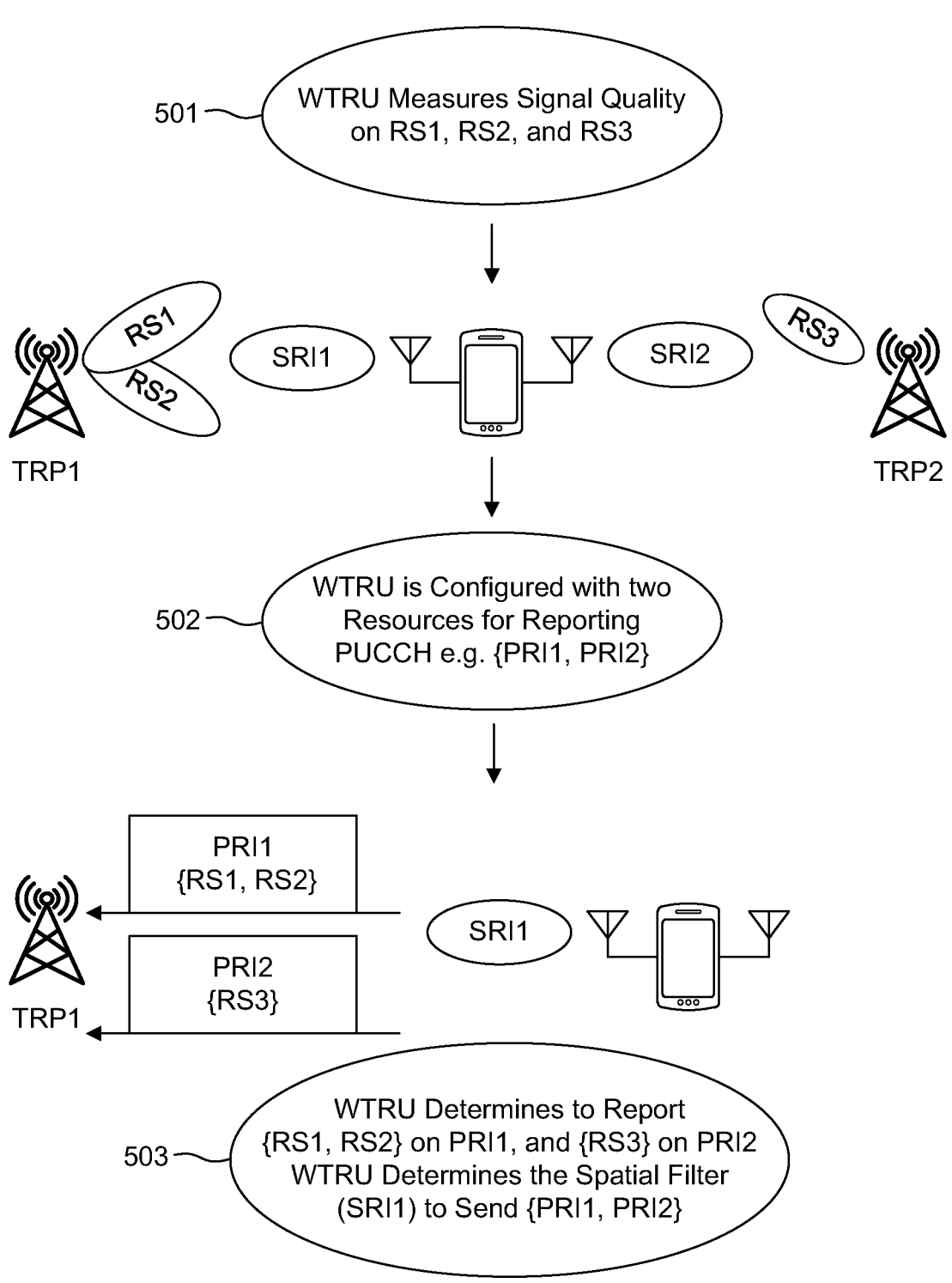
FIG. 5 is a diagram illustrating an example scenario of one or more embodiments disclosed herein regarding WTRU reporting information to one or more TRPs.

FIG. 5 is a diagram illustrating an example with two TRPs (TRP1, TRP2), where a WTRU may be configured to report to one TRP the RSs of all TRPs that it received RSs from. In the example, TRP1 may be sending RS1 and RS2, and TR2 is sending RS3. At 501, the WTRU may measure the signal quality of RS1, RS2, and RS3. At 502, the WTRU may be configured with two resources for reporting using the PUCCH (e.g., PRI1, PRI2). At 503, the WTRU may report RS1 and RS2 on PRI1 to TRP1, and RS3 on PRI2 to TRP1; further, the WTRU may determine the spatial filter (SRI1) to send (PRI1, PRI2).

The WTRU may determine that the PUCCH1 may be used to report RSs from TRP1, and PUCCH2 may be used to report RSs from TRP2. Since PUCCH1 is used for TRP1, the WTRU may determine to use the SRI configured for TRP1, SRI1. TRP1 may monitor PUCCH1 and PUCCH2, and may determine that it may schedule the WTRU with one RS received from PUCCH1 and one received from PUCCH2 for S-DD operation. After reporting on PUCCH1 and PUCCH2, the WTRU may monitor for S-DD scheduled transmission from TRP1 and TRP2. If a WTRU determines that it prefers non S-DD mode, it may report on only one PUCCH resource (e.g., PUCCH1). The TRP may determine that it received one PUCCH resource and may determine to schedule the WTRU in non S-DD mode.

In another example, the WTRU may use RS sets to report spatial filters per panel. A WTRU with two panels may measure RSs from RS set 1. Set 1 may be linked to 2 PUCCH resources. The WTRU may determine that any RS measurement from set 1 received on panel 1 may be reported on PUCCH1 while any RS measurement from set 1 received on panel 2 may be reported on PUCCH2. The TRP may monitor both PUCCH resources and may determine which RSs are the best for each WTRU panel based on the received PUCCH resource and its content. The WTRU may determine to send on only one PUCCH resource to signal it prefers single panel use. The TRP may determine that it received one PUCCH resource out of two and may determine to schedule the WTRU with a single panel.

A subset of RSs within an RS set may be linked with each other, and the RS set may be configured with two PUCCH resources. A WTRU may signal its preference to switch to S-DD mode by determining to report RSs that are linked together. For example, RS1 and RS3 may be linked for S-DD mode, while RS2 and RS3 may not be linked. The WTRU may report the linked RSs (e.g., RS1 on PUCCH1 and RS3 on PUCCH2) when it determines S-DD mode is preferred while the WTRU may report the unlinked RSs (e.g., RS2 on PUCCH1 and RS3 on PUCCH2) when it determines single TRP mode is preferred. The TRP may schedule the WTRU with S-DD on RS1 and RS3, or it may schedule the WTRU with TDM transmission on single (or multi-TRP) on RS2 and RS3 depending on the received report. If the WTRU sends RSs in two different PUCCH resources that are linked and the TRP only receives one of the PUCCH resources, the TRP may determine that one of the RS signal quality is low. In this event, the TRP may trigger a beam pairing procedure (e.g., trigger the WTRU to send aperiodic SRSs) or update PUCCH spatial relations through MAC-CE.

In one situation, there may be an implicit link between beam related information and spatial filter selection. In one instance, the WTRU may determine a link between a spatial filter (e.g., an RS index) and an SRI, and signal the link implicitly to the TRP by the WTRU's selection of a PUCCH resource and SRI. When the WTRU generates the CSI report to send on the PUCCH resource, the WTRU may choose which RSs to include in the report. When the WTRU selects the SRI to transmit the PUCCH resource, the WTRU may determine that the beam related info (e.g., indices, signal quality, etc.) included in the CSI report are measured assuming the selected SRI. The TRP may use the information about the link between RS and SRI to determine whether it can schedule RS simultaneously, which RSs are best per SRI, and the like.

Figure 6:
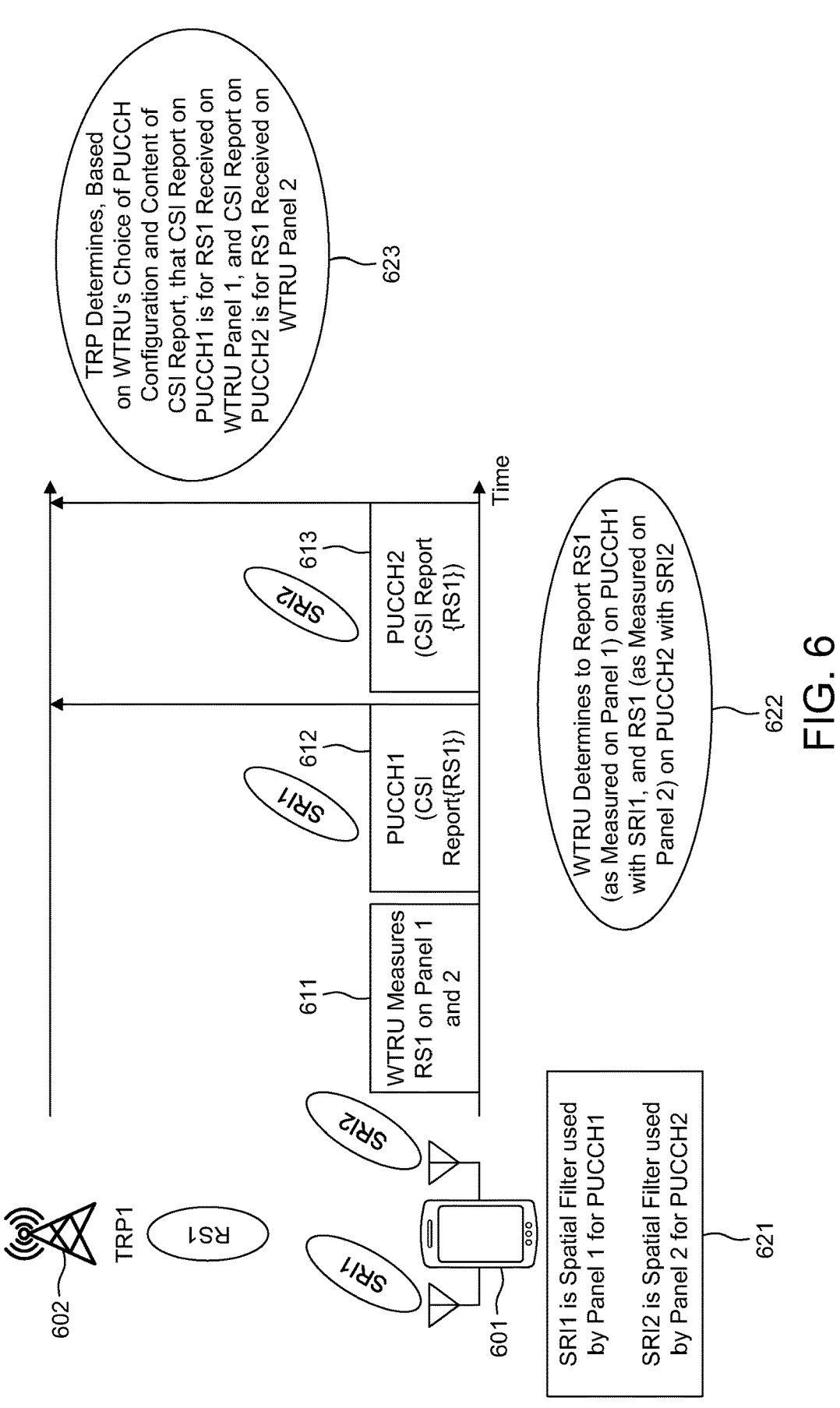
FIG. 6 is a diagram illustrating an example scenario of one or more embodiments disclosed herein regarding WTRU assisting a TRP.

FIG. 6 is a diagram illustrating an example scenario of a WTRU assisting a TRP according to one or more techniques disclosed herein. In FIG. 6, the WTRU 601 may assist the TRP 602 to link the contents of a CSI report (e.g., RS1) to a panel of the WTRU 601. At 611, the WTRU may measure RS1 on panel 1 and panel 2. The WTRU 601 may transmit two CSI reports (e.g., 612, 613) for (RS1) on two PUCCH resources where each CSI report measures the signal quality of RS1 received on panel 1 and 2, respectively. At 621, the two PUCCH resources may be configured with two different SRIs where SRI1 is associated to WTRU panel 1 and SRI2 is associated to WTRU panel 2. At 622, the WTRU 601 may determine that RS1 received on panel 1 may be reported on the PUCCH configured with SRI1 (612), and RS1 received on panel 2 may be reported on PUCCH resource configured with SRI2 (613). At 623, the TRP 602 may monitor for both PUCCH resources and may determine that the CSI report in each PUCCH resource corresponds to the WTRU's measurements on the panel (e.g., the spatial filter) associated to the SRI used to send the PUCCH.

In another example, both SRIs may be configured on the same panel and the WTRU may measure RS1 and RS2 as received on SRI1 and SRI2 separately. The WTRU may report on PUCCH1 the CSI report for RS1 and RS2 as measured with SRI1, and report on PUCCH2 the CSI report for RS1 and RS2 as measured with SRI2.

The WTRU may also report beam related information for S-DU operation in this manner. The WTRU may determine that the RS in the CSI report and the SRI used to send the CSI report may be paired for S-DU operation.

In some embodiments, there may by methods for S-UU transmission mode. Further, there may be techniques disclosed herein for WTRU based panel selection. As disclosed herein, a TCI state may be interchangeably used with spatial relation info and beam indication but still consistent with this disclosure. Further, as disclosed herein, SRS resource set may be interchangeably used with SRS resource and WTRU panel but still consistent with this disclosure.

In some situations, there may be a mode of operation for a WTRU concerning S-UU transmission. A WTRU may support S-UU transmission based on one or more of following modes of operation. In one instance, there may be a mode of operation that may be determined based on the number of PUCCH resource indicator in UL DCI. For example, if a gNB indicates one PUCCH resource for PUCCH transmission, the WTRU may determine to use a single PUCCH transmission. If the gNB indicates more than one PUCCH resources, the WTRU may determine to use S-UU transmission. In one instance, there may be a mode of operation that may be determined based on a WTRU capability and gNB configuration based on the WTRU capability reporting. For example, the WTRU may be configured with an enhanced transmission type for S-UU transmission. For example, the WTRU may be configured with an enhanced type of PUCCH resource indicator which indicates one or more PUCCH resources per PUCCH resource indicator value. The configuration may be applied to the WTRU or one or more PUCCH resource sets of the WTRU. In one instance, a WTRU may request its preferred mode of operation for S-UU transmission. For example, if the WTRU is capable to support both a single uplink transmission and S-UU transmission, the WTRU may indicate to gNB for the preferred mode of operation.

In a first mode of operation (e.g., single uplink transmission), a WTRU may transmit a single PUCCH or PUSCH based on a configured/indicated resource. In a second mode of operation (e.g., S-UU transmission), the WTRU may simultaneously transmit one or more of PUCCHs and/or one or more of PUSCHs.

In some situations, there may be a beam indication for S-UU. A WTRU may receive one or more indications to indicate one or more beams to be used for S-UU transmission. The one or more indications may be based on one or more of following: beam indication in DCI; beam indication in MAC CE; and/or, beam indication in RRC.

For a beam indication in DCI, in an example the WTRU may receive one or more TCI states via a PDCCH which schedules S-UU transmission. In an example the WTRU may receive a first TCI state via a PDCCH which schedules S-UU transmission. Based on the first TCI state, the WTRU may determine a second TCI state which is associated with the first TCI state. The association may be indicated via RRC, MAC CE and/or DCI by a gNB. The indication of the one or more TCI states may be based on two or more configured/activated TCI states (e.g., via RRC and/or MAC CE) by a gNB.

For a beam indication in MAC CE, in an example the WTRU may receive one or more TCI states via MAC CE for S-UU transmission. In an example, the WTRU may receive a TCI state group compromising one or more TCI states via MAC CE. The indication of the one or more TCI states may be based on two or more configured TCI states (e.g., via RRC) by a gNB.

For a beam indication in RRC, in an example the WTRU may receive one or more TCI states via one or more RRC messages for S-UU transmission. The indication of the one or more TCI states may be per PUCCH resource and/or PUCCH resource group. The indication of the one or more TCI state may be per PUSCH configuration and/or Configured grant configuration.

In some situations, there may be a determination of time offsets between one or more PUCCHs and/or one or more PUSCHs. Specifically, a WTRU may receive one or more time domain resource configurations for uplink transmissions. The one or more time domain resource configurations may comprise one or more of following: minimum applicable scheduling offset (e.g., the WTRU may one or more offset values (e.g., slot) configured by RRC for active DL and/or UL BWPs, where based on the configured value, the WTRU may receive an indication via DCI); starting symbol S (e.g., the starting symbol may be relative to the start of the slot); and/or, length L, and/or number of symbols (e.g., the length may indicate a number of consecutive symbols S counting from the symbol S allocated for the uplink transmissions).

The one or more time domain resource configurations may be based on one or more of following: explicit indication; implicit indication; and/or, a combination of explicit indication(s) and implicit indication(s).

For explicit indication, in one example a WTRU may receive an indication of the one or more time domain resource configurations via DCI based on predefined multiple time domain resource configurations. In one example, a WTRU may receive an indication of the one or more time domain resource configurations via DCI based on multiple time domain resource configurations via RRC.

For implicit indication, in one example a WTRU may receive a time domain resource configuration associated with a TCI state. The WTRU may apply a time domain resource configuration associated with a TCI state when the WTRU transmits a PUCCH or a PUSCH with the TCI state. In one example, a WTRU may receive a time domain resource configuration associated with an SRS resource set. The WTRU may apply a time domain resource configuration associated with an SRS resource set when the WTRU transmits a PUCCH or a PUSCH with the TCI state.

For a combination of explicit indication and implicit indication, in one example a WTRU may receive an indication of the one or more time domain resource configurations via DCI (e.g., based on predefined configurations or configurations via RRC). Based on the indication, a time domain resource configuration associated with a TCI state may indicate additional time offset from the one or more time domain resource configurations via DCI. For example, a WTRU may receive an indication of the one or more time domain resource configurations via DCI (e.g., based on predefined configurations or configurations via RRC). Based on the indication, a time domain resource configuration associated with an SRS resource set may indicate additional time offset from the one or more time domain resource configurations via DCI.

In one situation, a WTRU may determine one or more time domain resources for S-UU transmission based on the one or more time domain resource configurations. The determination may be based on one or more of following:

whether indicated TCI states are applicable for S-UU transmission or not; and/or, WTRU capability and gNB configuration.

Regarding whether indicated TCI states are applicable for S-UU transmission or not, in one example, if the WTRU is able to apply the indicated TCI states simultaneously for S-UU transmission, the WTRU may determine a first time domain resource configuration. If the WTRU is not able to apply the indicated TCI states simultaneously, the WTRU may determine two or more second time domain resource configurations for separate transmissions. The determination may be based on one or more of following: determination between DCI and TCI states; determination between TCI states; determination between DCI and SRS resource sets; determination between DCI and SRS resource sets; determination between SRS resource sets; and/or, determination between DCI and preconfigured resource.

Regarding the determination between DCI and TCI states, in one example the first time domain resource configuration may be indicated via DCI (e.g., via time domain resource assignment field) and the second time domain resource configuration may be indicated via the indicated TCI states. In another example, the first time domain resource configuration may be based on DCI and the second time domain resource configuration may be based on DCI and the indicated TCI states.

Regarding the determination between TCI states, in one example, the first time domain resource configuration may be based on a first TCI state and the second time domain resource configuration may be based on the first TCI state and a second TCI state. The first TCI state may be determined based on TCI state ID (e.g., a TCI state with lowest or highest TCI state ID), indication order (e.g., a firstly indicated TCI state), and/or predefined TCI state.

Regarding the determination between DCI and SRS resource sets, in one example, the first time domain resource configuration may be indicated via DCI (e.g., via time domain resource assignment field) and the second time domain resource configuration may be indicated via the indicated SRS resource sets. In another example, the first time domain resource configuration may be based on DCI and the second time domain resource configuration may be based on DCI and the indicated SRS resource sets.

Regarding the determination between SRS resource sets, in one example, the first time domain resource configuration may be based on a first SRS resource set and the second time domain resource configuration may be based on the first SRS resource set and a second SRS resource set. The first SRS resource set may be determined based on SRS resource set ID (e.g., a SRS resource set with lowest or highest SRS resource set ID), indication order (e.g., a firstly indicated SRS resource set), and/or predefined SRS resource set.

Regarding the determination between DCI and preconfigured resource, in one example, the first time domain resource configuration may be based on DCI and the second time domain resource configuration may be based on DCI and the preconfigured resource. The WTRU may be configured with the preconfigured resource via RRC and/or MAC CE.

FIG. 7 is a flow chart of an example process for simultaneous UL TX to two TRPs. At 701, the WTRU may indicate a preferred mode of operation (e.g., simultaneous UL to two TRPs or single UL to one TRP). At 702, the WTRU may receive TCI states and determine one or more spatial filters for use for simultaneous UL (e.g., the spatial filters may correspond to pairs of TCI states associated together for simultaneous UL through RRC, MAC-CE, or DCI). At 703, the WTRU may determine time and/or frequency resources based on the TCI states (e.g., if the TCI states are associated with simultaneous UL, the WTRU may determine the time/frequency resources for each TRP).

In one situation, there may be the prioritization of the PUCCH and/or PUSCH transmission. Specifically, a WTRU may determine a prioritization between one or more PUCCHs and/or one or more PUSCHs (e.g., if the WTRU is not able to apply the indicated TCI states simultaneously). The prioritization between the one or more PUCCHs and/or the one or more PUSCHs may be one or more of following: dropping one or more uplink channels which have lower priority; and/or, transmitting the first one or more uplink channels with higher priority in allocated time and frequency resources and second one or more uplink channels with lower priority in preconfigured resources (e.g., via RRC).

The WTRU may determine priority of one or more uplink channels based on one or more of following: channel type (e.g., the WTRU may prioritize a first type of channel (e.g., PUCCH or PUSCH) than a second type of channel (e.g., PUSCH or PUCCH); information type (e.g., the WTRU may prioritize a first type of information (e.g., HARQ-ACK/NACK) than a second type of information (e.g., CSI reporting)); transmission type (e.g., the WTRU may prioritize a first type of transmission (e.g., aperiodic or semi-persistent) than a second type of transmission (e.g., semi-persistent or periodic); PUCCH resource ID (e.g., the WTRU may prioritize a first PUCCH resource with a first ID than a second PUCCH resource with a second ID, where the first ID may be smaller or larger than the second ID); and/or, time resource (e.g., the WTRU may prioritize a first uplink transmission than a second transmission based on time resource; and/or, a first time resource of the first uplink transmission may be smaller time offset (e.g., smaller number of symbols and/or slots) than a second time resource of the second uplink transmission.

In one situation, there may be a process for a WTRU assisted S-UU transmission mode selection. A WTRU may be scheduled for S-UU transmission of PUSCH or PUCCH, and the scheduling may be coordinated by the network. The network may measure channel quality (e.g., RSRP, SINR, CQI, etc.) on UL reference signals (e.g., SRS) and the network may determine if the WTRU will be scheduled in S-UU mode (e.g., WTRU transmits on two panels in the same time instance towards two TRPs). In one alternative, there may be a single panel mode, where a WTRU transmits on one panel at a time in one time instance. However, the WTRU may have additional information to determine whether S-UU transmission is needed. For example, to save power, a WTRU may only be transmitting in S-UU mode during fixed periods of time. Or a WTRU may be configured with more than two TPRs and may determine that a subset of its panels or a subset of TRPs is preferred for S-UU. Then the WTRU may need to indicate when and how to use S-UU mode to the network. In some cases (e.g., as described herein) there may be one or more processes for how the WTRU may determine to use S-UU mode and how the WTRU reports it to the network.

In one case, the WTRU may assist the network in determining to use S-UU mode of transmission. The WTRU may request the scheduling mode of operation between S-UU and single panel. The WTRU may determine the mode of operation based on one or more factors.

In one instance, a factor may be the DL signal quality to each TRP based on reference signals (RS) channel measurement (e.g., SSB-RSRP). For example, two RSs may be configured, and the WTRU may request S-UU if the difference in RSRP between two RSs is above a threshold, or if more than one measured RSRP is above a threshold.

In one instance, a factor may be the number of activated panels. The WTRU may request S-UU if the WTRU activates a number of panels above a threshold. For example, if a WTRU activates more than one panel, then the WTRU may request S-UU transmission.

In one instance, a factor may be a data buffer; for example, if the WTRU has a data quantity to send above a threshold, the WTRU may request S-UU transmission.

In one instance, a factor may be the number of TRPs; for example, if the WTRU is configured with a number of TRPs above a threshold then the WTRU may trigger a request.

In one case, after the WTRU determines a mode of operation, the WTRU may trigger an indication of the requested mode to the network with an explicit indication of the order of the different modes of operation based on, for example, a channel quality measurement. The WTRU may use a MAC-CE (e.g., a new MAC-CE) to report the ordering, or a UCI may be used (e.g., a new UCI). A WTRU may request or indicate an ordering of modes of operation in a numbered list where the ordering determines the WTRU's preference between S-UU and single panel mode of operation. For example, the WTRU may report as a first preference S-UU, and as a second preference single panel transmission mode of operation. The contents of the MAC-CE or UCI report may include one or more pieces of information.

In one instance, one piece of information may be a bit field for indicating S-UU or single panel mode. For example, the WTRU may be configured with two TRPs. In the report, the WTRU may set the bit=1 to mean the WTRU requests S-UU transmission mode to both TRPs, or the WTRU may set the bit=0 to request single panel mode.

In one instance, one piece of information may be TRP indices: if more than one TRP is configured to the WTRU, the WTRU may include TRP indices to indicate a subset of TRP pairs for S-UU mode amongst all configured TRPs. For example, a WTRU may be configured with 3 TRPs: TRP1, TRP2, and TRP3, and the WTRU may determine a subset of TRPs for S-UU. The WTRU may include the indices for TRP1 and TRP2 to indicate it requests transmitting in S-UU mode to TRP1 and TRP2. If more than one pair satisfies a selection threshold, the WTRU may report the pairs in order based on highest to lowest channel measurement. For example, TRP1 and TRP3 may also be reported in a list after the TRP1 and TRP2 pair if the WTRU determines it is a second pair satisfying a selection threshold.

Alternatively, the WTRU may indicate the TRP pair index. The pairs may be explicitly configured with an index. For example, TRP1 and TRP2 correspond to pair index 1, TRP1 and TPR3 correspond to pair index 2.

The pairs may be implicitly configured with an UL TCI codepoint which is configured with two UL TCI states and each TCI state is QCL'd with an RS to a different TRP. For example, an UL TCI is configured with RS1 and RS2 where RS1 and RS2 are QCL'd with TRP1 and TRP2, respectively. If the WTRU includes this UL TCI with two TCIs in the S-UU request, then the network may determine that the WTRU requests S-UU transmission with TRP1 and TRP2.

For example, one piece of information may be panel indices, where the WTRU is equipped with more than one panel, and the WTRU may report pairs of its panel indices where the WTRU requests S-UU transmission mode. For example, a WTRU may be equipped with three panels. The WTRU may report panel indices 1 and 2 to indicate it requests the network to be scheduled in S-UU mode using only panel 1 and 2.

In one instance, one piece of information may be a combination of some of the examples provided herein (e.g., one or more of the above disclosed pieces of information). For example, a WTRU may be configured with TRP1 and TRP2. The WTRU may report the pair indices corresponding to TRP1 and TRP2 with a bit index=1. The WTRU may thus indicate that it requests S-UU mode to TRP1 and TRP2. If the bit index=0, then the WTRU may request single panel transmission to TRP1 and TRP2 (e.g., transmit to TRP1 at time instance t1, then to TRP2 at time instance t2). The WTRU may include t1 and t2 as absolute time instances. Alternatively, the WTRU may indicate a timing pattern to switch between S-UU and single panel mode to TRP1 and TRP2 (e.g., 1-4 time slot pattern, where the WTRU requests 1 slot of S-UU followed by 4 slots of single panel).

Upon receiving the MAC-CE or UCI, the network may consider the WTRU's indicated request. The network may schedule the WTRU in S-UU mode or single panel considering the WTRU's reported request, the WTRU's ordering in the report, and the network's availability of resources. The WTRU may receive an acknowledgment of its MAC-CE or UCI request, and the WTRU may adjust its spatial filters/panels for transmission. Alternatively, the WTRU may receive a DCI with the scheduling information provided by the network.

The cases discussed for WTRU assisted S-UU transmission mode selection may also be used for WTRU assisted S-DU mode selection. For example, the WTRU may indicate which panel to use for UL and which panel for DL, or which TRP to use for UL or DL.

In one situation, there may be one or more simultaneous SRS transmission indication(s). A network may need to estimate channel quality when the WTRU is transmitting on both panels simultaneously. To better measure the cross-panel interference, a network may request the WTRU to transmit one or more RS from more than one panel simultaneously. In one case, a WTRU may be triggered to transmit SRS simultaneously by activating SRS resources for simultaneous transmission. The WTRU may transmit SRS simultaneously using one or more factors.

One factor may be a dynamic indication. For example, a DCI for SRS request may be used where more than one SRS resource may be requested. The SRS request field may be extended with an additional field, or a separate new field may be defined in the DCI. The bit field may indicate for example 1 if the requested SRS resources are transmitted simultaneously in S-UU mode or 0 if not.

One factor may be a MAC-CE. A new MAC-CE may be defined to configure association between SRS resources for S-UU transmission. After receiving the MAC-CE, the WTRU may determine to activate the indicated SRS resources for S-UU transmission mode, and may transmit the resource simultaneously. For example, the MAC-CE may include a list of SRS resource pairs, and the WTRU may determine that the SRS resource pairs are configured for S-UU transmission.

Alternatively/additionally, the SRS resources may be associated with a TRP index and the MAC-CE may include a list of TRP pairs. The TRP indices may be explicitly indicated, or a mapping between TRP index pairs and an indicator may be defined (e.g., TRP1-TRP2 corresponds to indicator 1, TRP1-TRP3 corresponds to indicator 2). The WTRU may determine that the TRP pairs determines which associated SRS resources are configured for S-UU mode.

For example, the WTRU may receive the MAC-CE with TRP1 and TRP2 as a pair. Then the WTRU may determine that all SRS resources associated to TRP1 and TRP2 are pairwise configured for S-UU transmission.

The WTRU may determine that an SRS-Config IE is configured with a new field in the SRS-ResourceSet, where the field may flag SRS-ResourceSets used for S-UU.

SRS resources may be configured with a panel index, and the WTRU may determine that resources with different panel indices may be transmitted simultaneously.

In some embodiments, there may be methods for S-DU transmission mode, such as techniques for support of S-DU operation. In some situations, there may be a WTRU S-DU capability signaling. Specifically, a WTRU may indicate its S-DU capability to a gNB, where the capability indication may contain information such as number of S-DU capable panels, UL/DL guard-time, UL/DL guard-band, or the like. The capability indication may include the number panels that can be used for S-DU operation. In an example, a WTRU may indicate the panels with S-DU capability, implicitly or explicitly. In an implicit approach, once a WTRU is interrogated by a gNB, it may indicate S-DU capability with SRS transmission using SRS resources assigned to the panel. In an explicit approach, a WTRU may indicate panels with S-DU capability, using an identification index like panel ID.

In one instance, a WTRU may indicate the minimum time required between UL and DL transmissions. There may be a single guard-time indicating the minimum time required between UL and DL transmissions, or two separate guard-times intended for UL-to-DL and DL-to-UL.

In one instance, a WTRU may indicate the minimum frequency separation required between UL and DL transmissions. There may be a single guard-band indicating the minimum frequency separation required between UL and DL transmissions, or two separate guard-times intended for UL-to-DL and DL-to-UL.

In one instance, a WTRU may indicate subsets of panels that may have full-duplex capability for operation in S-DU mode.

In one instance, a WTRU may indicate whether it can support S-DU mode across different bandwidth parts. For example, a WTRU may be configured with a DL transmission on one bandwidth part, and an UL transmission on a different bandwidth part.

In some situations, there may be a triggering mechanism for configured grant scheduling. Specifically, in NR, besides dynamic scheduling, both uplink and downlink transmissions may be supported by their corresponding configured grant mechanisms. For downlink, in semi-persistent scheduling (SPS) mode, a WTRU may first be configured by RRC with basic transmission parameters, and then the configured grant may be activated with a dynamic indication, such as a DCI scrambled with CS-RNTI. Similarly, in uplink configured grant Type-2 transmission, a WTRU may be configured first by RRC with basic transmission parameters, and then the configured grant may be activated with a dynamic indication, such as a DCI scrambled with CS-RNTI.

In one instance, a WTRU may be configured for joint configured UL/DL scheduling where the WTRU may transmit and receive with a same or different subsets of panels or beams.

For example, a WTRU may receive a single semi-static joint configuration for both uplink or downlink scheduling, or it may receive separate configurations for uplink and downlink transmission, respectively. The configurations may or may not have the same periodicity in time. The indicated time pattern for each configuration may or may not be the same. The indicated time patterns may be only partially overlapped. Also, the RRC configuration may also include a time offset indicating the start of the pattern relative to the reception of the dynamic activation command, such as DCI or MAC CE. In one case, configuration for each transmission direction may have a different time offset relative to the reception of the dynamic activation command.

In an example, a WTRU may receive a single dynamic command, such as a DCI or a MAC CE to activate the joint configured scheduling. A WTRU may be configured with a specific RNTI, like joint configured scheduling (JCS) RNTI, such as JCS-RNTI to descramble the received activation DCI command for joint configured scheduling.

In an example, a WTRU may monitor only a specific search space or CORESET for detection of activation command. Further, the configured TCI for the CORESET carrying the activation command may be used as an implicit indication for the beams to be used for at least one of the transmissions, such as UL or DL. For example, a WTRU may use the same beam employed for reception of the activation command for the pending configured grant UL transmission, or the pending scheduled DL transmission, or both.

Figure 8:
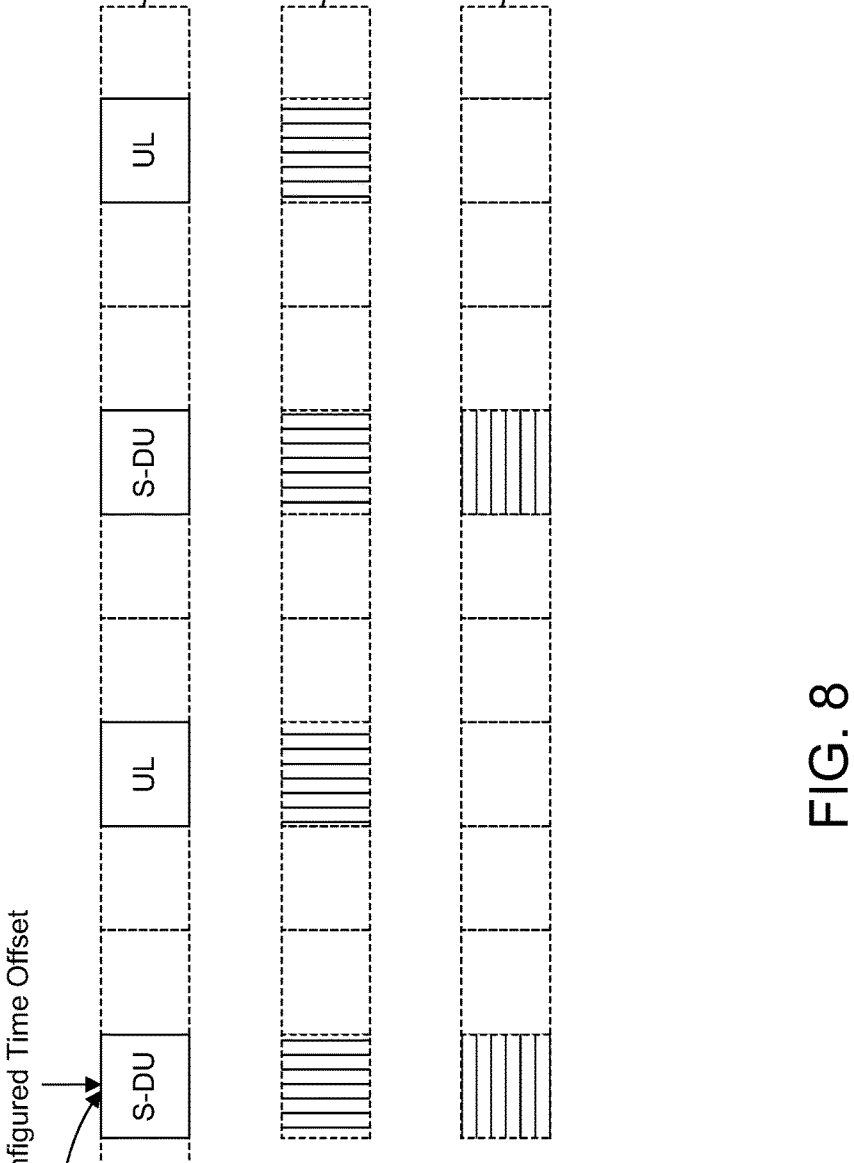
FIG. 8 is a diagram illustrating a WTRU operating in S-DU mode with different transmission pattern(s) for uplink and downlink transmission.

FIG. 8 is a diagram illustrating an example operation of a WTRU configured in S-DU mode that is scheduled with different transmission patterns for uplink and downlink transmission. Generally, the diagram may be read from left to right indicating time increments (e.g., if a pattern or text aligns vertically, then they may be interpreted as occurring in the same time increment). At 810, the WTRU transmission pattern is shown. At 820, the UL transmission pattern is shown. At 830 the downlink transmission pattern is shown. Note, at times when S-DU is configured for the WTRU in 810, corresponding UL and DL is scheduled (e.g., simultaneously, as shown in 820 and 830, respectively). Further, note that there are occasions where the WTRU only has UL configured in 810, and accordingly only the uplink pattern in 820 is showing in those instances.

In some embodiments, there may be one or more dropping rules for S-DU operation. Specifically, a WTRU may be configured to operate in a M-TRP transmission, where TRPs may or may not be part of a same cell. In one approach, a WTRU may be configured to receive DL transmissions from one TRP and to conduct UL transmission to a different TRP.

Despite receiving a scheduled S-DU transmission, a WTRU may have to re-allocate a subset of its panels or beams from one transmission type to another for various reasons, such as: blockage of a panel, MPE issue, power saving mode, poor channel quality, panel switching time, or the like. If a WTRU is not able to maintain S-DU operation, in a solution a WTRU may apply a priority rule to select continuity of a preferred transmission direction, such as UL or DL. The priority or selection criteria may be assumed fixed or configured to a WTRU. A WTRU may apply one or more criteria in its selection of the preferred transmission direction.

A WTRU may always prioritize transmissions related to a specific cell. The preferred cell may be always assumed fixed, such as always the primary or anchor cell. Or alternatively, a WTRU may be configured to assume a cell as the preferred cell.

In one instance, a WTRU may always prioritize transmission from/to a specific TRP. For example, a WTRU may always prioritize transmission from/to TRP1 regardless of any other aspect of a transmission, such as UL or DL. Alternatively, a WTRU may always prioritize DL transmissions over UL transmissions. For example, a WTRU may continue reception and processing of a DL transmission from TRP2, such as PDSCH, and halt an UL transmission, such as PUSCH, to TRP1. Alternatively, a WTRU may always prioritize UL transmissions over DL transmissions.

In one instance, a WTRU may determine the priority of a transmission based on the importance and type of the channel of the pending transmission. The priority of the channels may be configured based on one or more different requirement(s), such as deployment scenario, power saving, UL vs. DL traffic load/type, and the like. For example, a WTRU may keep one transmission and may drop another transmission according to the following order: PBCH transmission, PRACH transmission, PDCCH transmission, PUCCH transmission with HARQ-ACK information and/or SR or PUSCH transmission with HARQ-ACK information, PUCCH transmission with CSI or PUSCH transmission with CSI, PUSCH transmission without HARQ-ACK information or CSI, SRS transmission (e.g., with aperiodic SRS having higher priority than semi-persistent and/or periodic SRS or PRACH transmission on a serving cell other than the PCell), PDSCH transmission.

In one instance, a WTRU may employ prioritization based on a service or traffic type. For instance, a WTRU may prioritize a critical transmission, such as URLLC, to TRP1 over an eMBB transmission from TRP2.

In one instance, a WTRU may apply prioritization based on whether a transmission is dynamically or semi-statically configured. For example, if a WTRU is configured with a configured UL or DL transmission, such as an UL configured transmission (Type 1 or 2), or a configured downlink scheduled transmission (SPS), a WTRU may always prioritize the semi-statically configured scheduled transmission.

Any embodiment or example described herein is not intended to be read in isolation of the rest of the description. Any embodiment described herein may be read in view of other techniques disclosed in other sections of the description. Any embodiment described herein may comprise of steps, where any step, taken in part or in whole, may be optional and may be performed in any order.

As described herein, a higher layer may refer to one or more layers in a protocol stack, or a specific sublayer within the protocol stack. The protocol stack may comprise of one or more layers in a WTRU or a network node (e.g., eNB, gNB, server, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non-Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit receive unit (WTRU), the method comprising:

receiving radio resource control (RRC) configuration information, wherein the RRC configuration information indicates a first number of channel state information-reference signal (CSI-RS) resources of a first set and a second number of CSI-RS resources of a second set, wherein the first set has a different quantity of resources than the second set, wherein the RRC configuration information indicates a pair of CSI-RS resources including a first CSI-RS resource from the first number of CSI-RS resources and a second CSI-RS resource from the second number of CSI-RS resources, wherein the first and second CSI-RS resources of the pair of CSI-RS resources are configured within a same slot, wherein the RRC configuration information indicates a reporting constraint of a plurality of reporting constraints;

determining beam related information including a first CSI resource indicator (CRI), a second CRI, and a third CRI, and wherein the first CRI corresponds to the first and second CSI-RS resources of the pair of CSI-RS resources, the second CRI corresponds to the first CSI-RS resource from the first number of CSI-RS resources, and the third CRI corresponds to the second CSI-RS resource from the second number of CSI-RS resources; and sending CSI reporting information including a selection of the beam related information based on the reporting constraint of a plurality of reporting constraints, wherein the CSI reporting information includes at least the first CRI associated with multiple transmit receive points (TRPs) and the second CRI associated with a single transmission receive point.

2. The method of claim 1, further comprising receiving a transmission from one or more TRPs selected based on the CSI reporting information.

3. The method of claim 1, wherein each CRI is associated with at least one of a rank indicator (RI), a channel quality indicator (CQI), or a precoding matrix indicator (PMI).

4. The method of claim 1, wherein a first pair of a plurality of pairs of CSI-RS resources is measured, wherein each CSI-RS resource is transmitted from a different TRP of the multiple TRPs.

5. The method of claim 1, wherein the first set has a first group identity that is associated with a TRP index.

6. A wireless transmit receive unit (WTRU), the WTRU comprising:

a transceiver operatively connected to a processor, the transceiver and processor configured to receive radio resource control (RRC) configuration information, wherein the RRC configuration information indicates a number of channel state information-reference signal (CSI-RS) resources of a first set and a second number of CSI-RS resources of a second set, wherein the first set has a different quantity of resources than the second set, wherein the RRC configuration information indicates at least one pair of CSI-RS resources including a first CSI-RS resource from the first number of CSI-RS resources and a second CSI-RS resource from the second number of CSI-RS resources, and wherein the first and second CSI-RS resources of the pair of CSI-RS resources are configured within a same slot, wherein the RRC configuration information indicates a reporting constraint of a plurality of reporting constraints;

the processor configured to the transceiver and processor configured to determine beam related information including a first CSI resource indicator (CRI), a second CRI, and a third CRI, wherein the first CRI corresponds to the first and second CSI-RS resources of the pair of CSI-RS resources, the second CRI corresponds to the first CSI-RS resource from the first number of CSI-RS resources, and the third CRI corresponds to the second CSI-RS resource from the second number of CSI-RS resources; and the transceiver and processor configured to send CSI reporting information including a selection of the beam related information based on the reporting constraint of a plurality of reporting constraints, wherein the CSI reporting information includes at least the first CRI associated with multiple transmit receive points (TRPs) and the second CRI associated with a single transmission receive point.

7. The WTRU of claim 6, the transceiver and processor configured to receive a transmission from one or more TRPs selected based on the CSI reporting information.

8. The WTRU of claim 6, wherein each CRI is associated with at least one of a rank indicator (RI), a channel quality indicator (CQI), or a precoding matrix indicator (PMI).

9. The WTRU of claim 6, wherein a first pair of a plurality of pairs of CSI-RS resources is measured, wherein each CSI-RS resource is transmitted from a different TRP of the multiple TRPs.

10. The WTRU of claim 6, wherein the first set has a first group identity that is associated with a TRP index.

11. A wireless transmit receive unit (WTRU), the WTRU comprising:

a transceiver operatively connected to a processor, the transceiver and processor configured to receive radio resource control (RRC) configuration information, wherein the RRC configuration information indicates a first number of channel state information-reference signal (CSI-RS) resources of a first set and a second number of CSI-RS resources of a second set, wherein the first set has a different quantity of resources than the second set, wherein the RRC configuration information indicates a pair of CSI-RS resources including a first CSI-RS resource from the first number of CSI-RS resources and a second CSI-RS resource from the second number of CSI-RS resources, wherein the first and second CSI-RS resources of the pair of CSI-RS resources are configured within a same slot, and wherein the RRC configuration information indicates one of a plurality of reporting constraints, the reporting constraints include a first reporting constraint and a second reporting constraint;

the processor configured to, on a condition that the RRC configuration information indicates the first reporting constraint, determine beam related information including a first CSI resource indicator (CRI), a second CRI, and a third CRI, wherein the first CRI corresponds to the first and second CSI-RS resources of the pair of CSI-RS resources, the second CRI corresponds to the first CSI-RS resource from the first number of CSI-RS resources, and the third CRI corresponds to the second CSI-RS resource from the second number of CSI-RS resources;

the processor configured to, on a condition that the RRC configuration information indicates the second reporting constraint, determine a second beam related information including one of the first CRI, the second CRI, or the third CRI, wherein the first CRI corresponds to the first and second CSI-RS resources of the pair of CSI-RS resources, the second CRI corresponds to the first CSI-RS resource from the first number of CSI-RS resources, and the third CRI corresponds to the second CSI-RS resource from the second number of CSI-RS resources; and the transceiver and processor configured to send CSI reporting information including a selection of the beam related information based on the first reporting constraint.

* * * * *